US010877644B2

(12) United States Patent
Hughes et al.

(10) Patent No.: US 10,877,644 B2
(45) Date of Patent: *Dec. 29, 2020

(54) FANTASY SPORTS CONTEST HIGHLIGHT SEGMENTS SYSTEMS AND METHODS

(71) Applicant: Rovi Technologies Corporation, San Jose, CA (US)

(72) Inventors: Patrick J. Hughes, Vienna, VA (US); David Barber, Tulsa, OK (US)

(73) Assignee: Rovi Technologies Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,091

(22) Filed: Oct. 24, 2018

(65) Prior Publication Data

US 2019/0056852 A1 Feb. 21, 2019

Related U.S. Application Data

(63) Continuation of application No. 15/399,275, filed on Jan. 5, 2017, now Pat. No. 10,139,999, which is a (Continued)

(51) Int. Cl.
*A63F 13/828* (2014.01)
*G06F 3/0484* (2013.01)
(Continued)

(52) U.S. Cl.
CPC ........ *G06F 3/04842* (2013.01); *A63F 13/828* (2014.09); *H04N 21/25891* (2013.01);
(Continued)

(58) Field of Classification Search
None
See application file for complete search history.

(56) References Cited

U.S. PATENT DOCUMENTS 4,093,223 A 6/1978 Wilke et al.
4,322,612 A 3/1982 Lange
(Continued)

FOREIGN PATENT DOCUMENTS

WO WO 2001/033482 5/2001
WO WO 2003/015403 2/2003

OTHER PUBLICATIONS

"SportsLine.com, Inc. Acquires Daedalus World Wide Corporation and Forges Long-Term Strategic Relationship with Internet Sports Network, Inc.", Dec. 2, 1999, PR Newswire, p. 3809.
(Continued)

*Primary Examiner* — Damon J Pierce
(74) *Attorney, Agent, or Firm* — Haley Guiliano LLP

(57) ABSTRACT

Systems and methods for providing multimedia highlight segments featuring real-life action related to fantasy sports competition. Links to highlight segments are provided in conjunction with fantasy sports contest information. A Highlight Center is provided with links to compilations of highlight segments featuring the best action culled from a pool of highlight segments. The user may be alerted of newly available highlight segments affecting fantasy scoring while the user watches a fantasy sports related television broadcast.

20 Claims, 26 Drawing Sheets

Related U.S. Application Data continuation of application No. 14/198,242, filed on Mar. 5, 2014, now Pat. No. 9,557,901, which is a continuation of application No. 10/234,725, filed on Aug. 30, 2002, now Pat. No. 8,702,504.

(60) Provisional application No. 60/338,916, filed on Nov. 5, 2001.

(51) Int. Cl.
| | | |
|---|---|---|
| H04N 21/475 | (2011.01) | |
| H04N 21/478 | (2011.01) | |
| H04N 21/258 | (2011.01) | |
| H04N 21/45 | (2011.01) | |
| H04N 21/858 | (2011.01) | |

(52) U.S. Cl.
CPC ....... *H04N 21/4532* (2013.01); *H04N 21/478* (2013.01); *H04N 21/4755* (2013.01); *H04N 21/4781* (2013.01); *H04N 21/8586* (2013.01)

(56) References Cited

U.S. PATENT DOCUMENTS

| | | | |
|---|---|---|---|
| 4,527,798 A | 7/1985 | Siekierski et al. | |
| 4,918,603 A | 4/1990 | Hughes et al. | |
| 4,977,503 A | 12/1990 | Rudnick et al. | |
| 5,018,736 A | 5/1991 | Pearson et al. | |
| 5,155,591 A | 10/1992 | Wachob | |
| 5,223,924 A | 6/1993 | Strubbe | |
| 5,263,723 A | 11/1993 | Pearson et al. | |
| 5,276,312 A | 1/1994 | McCarthy | |
| 5,489,096 A | 2/1996 | Aron | |
| 5,501,091 A | 3/1996 | Hayashi | |
| 5,539,822 A | 7/1996 | Lett | |
| 5,564,701 A | 10/1996 | Dettor | |
| 5,575,474 A | 11/1996 | Rossides | |
| 5,589,892 A | 12/1996 | Knee et al. | |
| 5,593,349 A | 1/1997 | Miguel et al. | |
| 5,636,920 A | 6/1997 | Shur et al. | |
| 5,713,793 A | 2/1998 | Holte | |
| 5,734,720 A | 3/1998 | Salganicoff | |
| 5,768,382 A | 6/1998 | Schneier et al. | |
| 5,769,714 A | 6/1998 | Wiener et al. | |
| 5,772,512 A | 6/1998 | Chichester | |
| 5,794,210 A | 8/1998 | Goldhaber et al. | |
| 5,842,921 A | 12/1998 | Mindes et al. | |
| 5,843,397 A | 12/1998 | Goldenberg | |
| 5,846,132 A | 12/1998 | Junkin | |
| 5,860,862 A | 1/1999 | Junkin | |
| 5,905,988 A | 5/1999 | Schwartz et al. | |
| 5,913,040 A | 6/1999 | Rakavy et al. | |
| 5,970,143 A | 10/1999 | Schneier et al. | |
| 5,971,854 A | 10/1999 | Pearson et al. | |
| 5,971,862 A | 10/1999 | Yates | |
| 5,991,735 A | 11/1999 | Gerace | |
| 6,015,344 A | 1/2000 | Kelly et al. | |
| 6,018,768 A | 1/2000 | Ullman et al. | |
| 6,038,368 A | 3/2000 | Boetje et al. | |
| 6,110,041 A | 8/2000 | Walker et al. | |
| 6,135,881 A | 10/2000 | Abbott et al. | |
| 6,144,375 A | 11/2000 | Jain et al. | |
| 6,177,931 B1 | 1/2001 | Alexander et al. | |
| 6,193,610 B1 | 2/2001 | Junkin | |
| 6,210,277 B1 | 4/2001 | Stefan | |
| 6,268,849 B1 | 7/2001 | Boyer et al. | |
| 6,319,123 B1 | 11/2001 | Paludi | |
| 6,371,855 B1 | 4/2002 | Gaviloff | |
| 6,553,178 B2 | 4/2003 | Abecassis | |
| 6,597,960 B2 | 7/2003 | Spector | |
| 6,601,103 B1 | 7/2003 | Goldschmidt et al. | |
| 6,611,654 B1 | 8/2003 | Shteyn | |
| 6,669,565 B2 | 12/2003 | Liegey | |
| 6,735,487 B1 | 5/2004 | Marshall et al. | |
| 6,745,236 B1 | 6/2004 | Hawkins et al. | |
| 6,750,919 B1 | 6/2004 | Rosser | |
| 6,775,580 B2 | 8/2004 | Jira et al. | |
| 6,837,789 B2 | 1/2005 | Garahi et al. | |
| 6,837,791 B1 | 1/2005 | McNutt et al. | |
| 7,001,279 B1 | 2/2006 | Barber et al. | |
| 7,006,881 B1 | 2/2006 | Hoffberg | |
| 7,058,592 B1 | 6/2006 | Heckerman et al. | |
| 7,136,871 B2 | 11/2006 | Ozer et al. | |
| 7,370,342 B2 | 5/2008 | Ismail et al. | |
| 7,435,176 B2 | 10/2008 | McNutt et al. | |
| 7,548,242 B1 | 6/2009 | Hughes et al. | |
| 7,614,944 B1 | 11/2009 | Hughes et al. | |
| 7,690,991 B2 | 4/2010 | Black | |
| 7,699,701 B2 | 4/2010 | Corbo | |
| 7,791,607 B1 | 9/2010 | Hughes et al. | |
| 7,872,655 B2 | 1/2011 | Hughes et al. | |
| 8,028,315 B1 | 9/2011 | Barber | |
| 2001/0019965 A1 | 9/2001 | Ochi | |
| 2001/0034734 A1 | 10/2001 | Whitley et al. | |
| 2001/0036853 A1 | 11/2001 | Thomas | |
| 2001/0041612 A1 | 11/2001 | Garahi et al. | |
| 2001/0056577 A1 | 12/2001 | Gordon et al. | |
| 2002/0023002 A1 | 2/2002 | Staehelin | |
| 2002/0034980 A1 | 3/2002 | Lemmons et al. | |
| 2002/0046099 A1 | 4/2002 | Frengut et al. | |
| 2002/0059094 A1 | 5/2002 | Hosea et al. | |
| 2002/0107073 A1 | 8/2002 | Binney | |
| 2002/0115488 A1 | 8/2002 | Berry et al. | |
| 2002/0124252 A1 | 9/2002 | Schaefer et al. | |
| 2002/0136528 A1* | 9/2002 | Dagtas ................ | G11B 27/105 386/227 |
| 2002/0157101 A1 | 10/2002 | Schrader et al. | |
| 2003/0005437 A1 | 1/2003 | Feuer et al. | |
| 2003/0054885 A1 | 3/2003 | Pinto et al. | |
| 2003/0096651 A1 | 5/2003 | Black | |
| 2003/0147589 A1 | 8/2003 | Patoz | |
| 2004/0117831 A1 | 6/2004 | Ellis et al. | |
| 2005/0096109 A1 | 5/2005 | McNutt et al. | |
| 2006/0148569 A1 | 7/2006 | Beck | |
| 2006/0253868 A1 | 11/2006 | Ludvig et al. | |
| 2009/0019485 A1 | 1/2009 | Ellis et al. | |
| 2010/0179867 A1 | 7/2010 | Hughes et al. | |
| 2010/0192179 A1 | 7/2010 | Ellis et al. | |
| 2010/0210331 A1 | 8/2010 | Hughes et al. | |
| 2010/0211465 A1 | 8/2010 | Hughes et al. | |
| 2010/0315426 A1 | 12/2010 | Hughes et al. | |
| 2011/0166939 A1 | 7/2011 | Junkin et al. | |

OTHER PUBLICATIONS

Non-Final Office Action dated Sep. 16, 2010 for U.S. Appl. No. 12/212,873, filed Sep. 18, 2008.
CBS Sportsline. Football Fans Can Keep Their Eye on CBS SportsLine.com (online], Aug. 31, 2000 [retrieved on Oct. 7, 2005]. Retrieved from the Internet <URL: http://about.sportsline.com/releases/nt100.htm>.
Cliff Charpentier, "1984 Fantasy Football Digest," Fantasy Sports Inc., Jun. 1984.
Jim Donaldson, "The Official Fantasy Football League Manual," Contemporary Books, Inc., 1985.
Cliff Charpentier, "1985 Fantasy Football Digest," Lerner Publications Company, 1985.
"All Pro Yearbook 1987: The Fantasy Football Magazine," All Pro Publishing Company, 1987.
BBC Sport, Fantasy Football Monthly, The Game <http://bbcfootball.fantasyleague.co.uk/ et al.> (accessed Sep. 17, 2002 *).
CNN Sports Illustrated, Fantasy Football Challenge http://football12201.si.cnn.com/et al. (accessed Sep. 23, 2002 *).
CNN Sports Illustrated, Fantasy Golf Challenge <http://gold5.si.cnn.com/ et al.> (accessed Sep. 23, 2002 *).
CNN Sports Illustrated, Fantasy Nascar Challenge <http://racing20.si.cnn.com/ et al.> (accessed Sep. 23, 2002 *).
CBS SportsLine.com, John B. Sample League <http://cbs.sportsline.com/> (accessed Nov. 24, 1999).
CBS SportsLine.com, Fantasy Baseball http://baseball101.fantasy.sportsline.com/ et al. (accessed Sep. 23-24, 2002 *).

(56) References Cited

OTHER PUBLICATIONS

CBS SportsLine.com, Fantasy Football http://football2145.fantasy.sportsline.com et al. (accessed Sep. 23-24, 2002 *).
CBS SportsLine.com, Fantasy Golf <http://golf1.fantasy.sportsline.com/ et al.> (accessed Sep. 23, 2002 *).
CBS SportsLine.com, Fantasy Hockey http://hockey2102.fantasy.sportsline.com/ et al. (accessed Sep. 23-24, 2002 *).
CBS SportsLine.com, Fantasy Racing <http://racing.fantasy.sportsline.com/ et al.> (accessed Sep. 23, 2002 *).
ESPN Internet Ventures, ESPN Fantasy Games <http://games.espn.go.com/cgi/home/request.dll?FRONTPAGE et al.> (accessed Sep. 16-18, 2002 *).
"Fantasy-Football," Franchise Football League (1989).
"Strat-0-Matic Pro Football," Strat-0-Matic Game Co. Inc. (1987).
"2000 Fantasy Basketball, Help Topics," Fantasy Sports Properties, Inc. (2000).
"2000 Fantasy Football, Help Topics," Fantasy Sports Properties, Inc. (2000).
"2000 Fantasy Hockey, Help Topics," Fantasy Sports Properties, Inc. (2000).
"2001 Fantasy Baseball, Help Topics," Fantasy Sports Properties, Inc. (2001).
"Strat-O-Matic Pro Football," Strat-O-Matic Game Co. Inc. (1987).

* cited by examiner

FIG. 4

| | Masters | | | | Contest Points | | Newbies | |
|---|---|---|---|---|---|---|---|---|
| Pos | Name | Stats | | | | Stats | Name | Pos |
| QB | J. Elway | 23/36 216 2TD | | | 15  23 | 35/523 78 4TD | J. Montana | QB |
| RB | R. Watters | 14-87 1TD | | | 10  7 | 23-117 2TD | K. Reeves | RB |
| WR | E. McCaffrey | 7-98 | | | 8  5 | 3-63 1TD | T. Hansen | WR |
| WR | I. Fryar | 2-45 | | | 8  5 | 2-50 | J. Smith | WR |
| TE | S. Sharpe | 6-76 | | | 8  6 | 4-33 | R. Watt | TE |
| DL | D. Washington | 4T | | | 6  7 | 5T 1S | T. John | DL |
| DL | K. Lockhart | 3T | | | 6  5 | 6T 3S | P. Chang | DL |
| LB | B. Romanowski | 7T 1S | | | 6  7 | 11T 1INT | T. Bosse | LB |
| LB | E. Woodridge | 4T 1INT | | | 6  7 | 15T 1S | F. Dure | LB |
| DB | G. Truman | 7T 2INT | | | 5  8 | 6T 2INT | A. Travis | DB |
| DB | B. Gumble | 8T | | | 4  3 | 5T | T. Dwight | DB |
| K | S. Trammel | 2/3 Fg 4 Pat | | | 4  3 | 4/5 Fg 1Pat | T. Will | K |
| | Masters | | | | 74  71 | Newbies | | |

| Pos | Name | PPG |
|---|---|---|
| QB | J. Elway | 20.7 |
| RB | R. Watters | 15.5 |
| WR | E. McCaffrey | 15.8 |
| WR | I. Fryar | 18.2 |
| TE | S. Sharpe | 12.7 |
| DL | D. Washington | 7.9 |
| DL | K. Lockhart | 8.8 |
| LB | B. Romanowski | 7.3 |
| LB | E. Woodridge | 5.2 |
| DB | G. Truman | 3.9 |
| DB | B. Gumble | 7.5 |
| K | S. Trammel | 5.6 |

My Roster — Masters

Highlight Center

J. Elway – QB
Masters
Week 7
15 Contest Pts.

FIG. 13

FANTASY SPORTS CONTEST HIGHLIGHT SEGMENTS SYSTEMS AND METHODS

CROSS REFERENCE TO RELATED APPLICATIONS

This application is a continuation of U.S. patent application Ser. No. 15/399,275, filed Jan. 5, 2017 (now allowed), which is a continuation of U.S. patent application Ser. No. 14/198,242, filed Mar. 5, 2014 (now U.S. Pat. No. 9,557,901), which is a continuation of U.S. patent application Ser. No. 10/234,725, filed Aug. 30, 2002 (now U.S. Pat. No. 8,702,504), which claims the benefit under 35 U.S.C. § 119(e) of U.S. Provisional Application No. 60/338,916, filed Nov. 5, 2001, all of which are hereby incorporated herein by reference in their entireties.

BACKGROUND OF THE INVENTION

This invention relates to fantasy sports contests, and more particularly, this invention relates to systems and methods for presenting highlight segments in a fantasy sports contest application.

Athletic endeavors have long supported a broad range of secondary competitions which include wagering on the outcome of particular games and wagering on the performance of a particular player.

In known fantasy sports contests, a user selects a roster, a team, a particular individual, or a group of individuals in an athletic contest. The user of a fantasy sports contest system is given the ability to take on the role of a fictional general manager with powers which may include the ability to draft, trade, dismiss and otherwise manage the player or players on the user's fantasy sports team.

Conventionally, the rules in a fantasy sports contest are set by a fantasy sports contest system provider, or are set by a league commissioner who sets the rules under which a group of fantasy or rotisserie sports contest users competes against each other. For example, for every goal scored in real-life by a member of the user's fantasy soccer team, a conventional fantasy sports contest system might award five fantasy points to the user in the fantasy competition.

The fantasy sports contest system provider may also provide additional services, which include providing statistical information on real-life games and players, tracking users' scores in the fantasy contest, and enabling transactions and other interactions among the users.

A fantasy sports contest may be based on a variety of real-life athletic events, and typically involves selecting players from real-life team sports (e.g., football, baseball, basketball, hockey, soccer or rugby), selecting players from real-life sports where individuals compete (e.g., golf, tennis or automotive racing), or selecting participants from competitions involving animals (e.g., horse and dog racing). The user's selections are typically stored in the user's fantasy sports contest roster. The performance of these selections in real-life competition determines the user's performance in the fantasy sports competition.

A fantasy sports contest goes beyond traditional one-time wagering applications (e.g., selecting picks for the winners of a weekend's football games or picking who will win a most valuable player award).

The performance of the user's fantasy sports contest selections is determined by the performance of the user's selections (e.g., athletes) in real-life competition. The user of a fantasy sports contest application will often have an interest in many, if not all, of the real-life competitions in which the user's contest picks and the user's opponent's contest picks are involved. This generates interest among the users in highlights of the real-life competitions. Fantasy sports contest users will be most interested in seeing highlights (e.g., video highlight segments) of the real-life competitions that are related to the user's performance in the fantasy sports contest. For example, a fantasy football user might want to see a highlight of those plays in which the user's contest picks scored touchdowns, or a highlight of those plays in which the user's contest picks scored fantasy contest points. It would therefore be desirable to present highlights in conjunction with a fantasy sports contest.

SUMMARY OF THE INVENTION

In view of the foregoing, it is therefore an object of the present invention to provide a fantasy sports contest application that provides a user with highlight segments.

This and other objects are accomplished in accordance with the principles of the present invention by providing the user with a fantasy sports contest application that supports the presentation of highlight segments. The highlight segments may be distributed by systems and methods substantially equivalent to systems and methods used to distribute fantasy sports contest application data. Alternatively, the highlight segments may be distributed by any other suitable systems and methods. For example, the fantasy sports contest application may include an Internet web browsing application and the highlight segments may be presented using one or more media player applications (e.g., Media Player For Windows™, Quicktime™, or Real Player™).

A highlight segment may include any suitable form of media. For example, a highlight segment may include static images, animated images, video, audio, rendered computer graphics, interactive content, text, any other suitable form of media, or any other suitable combination thereof. Highlight segments may include corresponding television broadcast segments, radio accounts of the relevant play, or both. Highlight segments may be provided by one or more third party suppliers (e.g., NFL Films™) of accounts and depictions of a game, which may provide segments from one or more camera angles.

A multimedia highlight segment may be a computer media file with audio and video information, a television audio and video signal, any other suitable media content, or any combination thereof. A multimedia highlight segment may be downloaded or streamed to user equipment.

The fantasy sports contest application of the present invention may be implemented on any suitable platform, or on any suitable combination of platforms. For example, in an interactive television system, the fantasy sports contest application may be implemented using a multichannel set-top box receiver, a television capable of running software programs, a two-way remote control, any other suitable device, or any suitable combination of devices. At least one of the devices used in an implementation is capable of communicating highlight segments to the user. The fantasy sports contest application may also be implemented on a personal computer with a connection to the Internet or any other computer network.

The fantasy sports contest application may be invoked by the user upon pressing one or more buttons on a remote control, by making a selection from a menu or other presentation of user-selectable choices, or by other suitable means by which a selection may be made (e.g., a speech recognition command interface). Alternatively, the fantasy sports contest application may be automatically invoked (e.g., upon the user tuning to a fantasy sports contest related television broadcast).

The fantasy sports contest application may display selectable elements (e.g., an icon, text, uniform resource locator ("URL") link or any other suitable indicator) representing highlight segments that are available for viewing, along with fantasy sports contest information. In one suitable approach, the selectable elements may be overlaid over particular portions of fantasy sports contest information regions. For example, a selectable element overlaid on an athlete's name may indicate that highlight segments are available featuring that athlete. By selecting a selectable element, the user may view highlight segments represented by the selectable element.

In another suitable arrangement, the fantasy sports contest application may display a highlight menu upon user selection of a selectable element. The highlight menu may divide the highlight segments represented by the selectable element into groups and enable the user to choose among the groups of highlight segments.

The fantasy sports contest application may display highlight segments in a variety of display formats. The fantasy sports contest application may display highlight segments simultaneously with the user's team roster or other fantasy sports contest information. The fantasy sports contest application may display highlight segments in a full screen, in an inset screen, in a display window, in an Internet web browser application display invoked by the fantasy sports contest application, or in any other suitable display. The user may be able to control the display of the highlight segment using a display control tool. The fantasy sports contest application may provide any suitable number of navigational highlight regions on a display screen.

The fantasy sports contest application may display an identification screen to identify a highlight segment or sequence of highlight segments being displayed. The identification screen may include information such as the name of the athlete, the position played by the athlete, the fantasy sports contest team affiliation of the athlete, and the number of points in the fantasy sports contest earned from the play that is about to be shown in the highlight segment. This information may be shown during the playback of the highlight segment as an reduced sized banner in some region of the display.

While playing a highlight segment in an inset screen or in a limited region of the display screen, the fantasy sports contest application may allow the user to further select other highlight segments for playback. Newly selected highlight segments may replace the currently playing highlight segment, or may be queued for display after the currently playing highlight segment.

The fantasy sports contest application may provide a Highlight Center to the user for viewing highlight segment compilations. In one suitable arrangement, the fantasy sports contest application may provide the user with highlight segment compilations featuring athletes on the user's fantasy sports contest team roster, athletes participating in a real-life athletic event associated with the user's fantasy sports contest, athletes associated with other users' rosters in the user's fantasy sports contest league, or athletes on a real-life sports team roster chosen by the user.

The fantasy sports contest application may use a variety of themes to create highlight segment compilations. Themes may also be customized by the user. For example, the fantasy sports contest application may compile highlight segments based on fantasy contest scoring, real-life scoring, real-life statistics, an athletic position being featured (e.g., a goalie in a hockey contest), a type of athletic play being featured (e.g., double plays in a baseball contest), a fantasy sports team being featured (e.g., the user's fantasy sports team), a real-life sports team being featured (e.g., the user's favorite real-life sports team), and any other suitable themes.

The highlight segment compilations may be pre-arranged, or may be instantly compiled by parsing a data base of highlight segments according to the user's selections. The fantasy sports contest application may enable the user to download highlight segment compilations to a personal video recorder device (e.g., a TiVo™ device) at the user's location or at any other suitable remote location (e.g., a network personal video recorder device) for viewing by the user.

In one embodiment of the present invention, the fantasy sports contest application may alert the user when a new highlight segment becomes available. The highlight segment may depict real-life action that affects the user's fantasy sports contest, or may depict real-life action of a particular real-life team or teams selected by the user. The fantasy sports contest application may alert the user based on various criteria such as fantasy contest scoring, real-life scoring, real-life action (e.g., a specific type of play), or other suitable criteria. The fantasy sports contest application may enable the user to select and edit criteria for receiving alerts.

A fantasy sports contest application supporting real-time highlight segments may enable the user both to watch a real-life game and to watch newly available highlight segments of interest to the user. When a relevant highlight segment is available, the fantasy sports contest application may show it automatically (e.g., in a picture-in-picture window) or give the user some visual or audio indication that a new relevant highlight segment is available for viewing.

Further features of the invention, its nature, and various advantages will be more apparent from the accompanying drawings and the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 4-6 show illustrative fantasy sports contest information display screens in accordance with the present invention;

FIG. 13 shows an illustrative identification screen displayed before a multimedia highlight segment in accordance with one embodiment of the present invention;

DETAILED DESCRIPTION OF THE INVENTION

Figure 1:
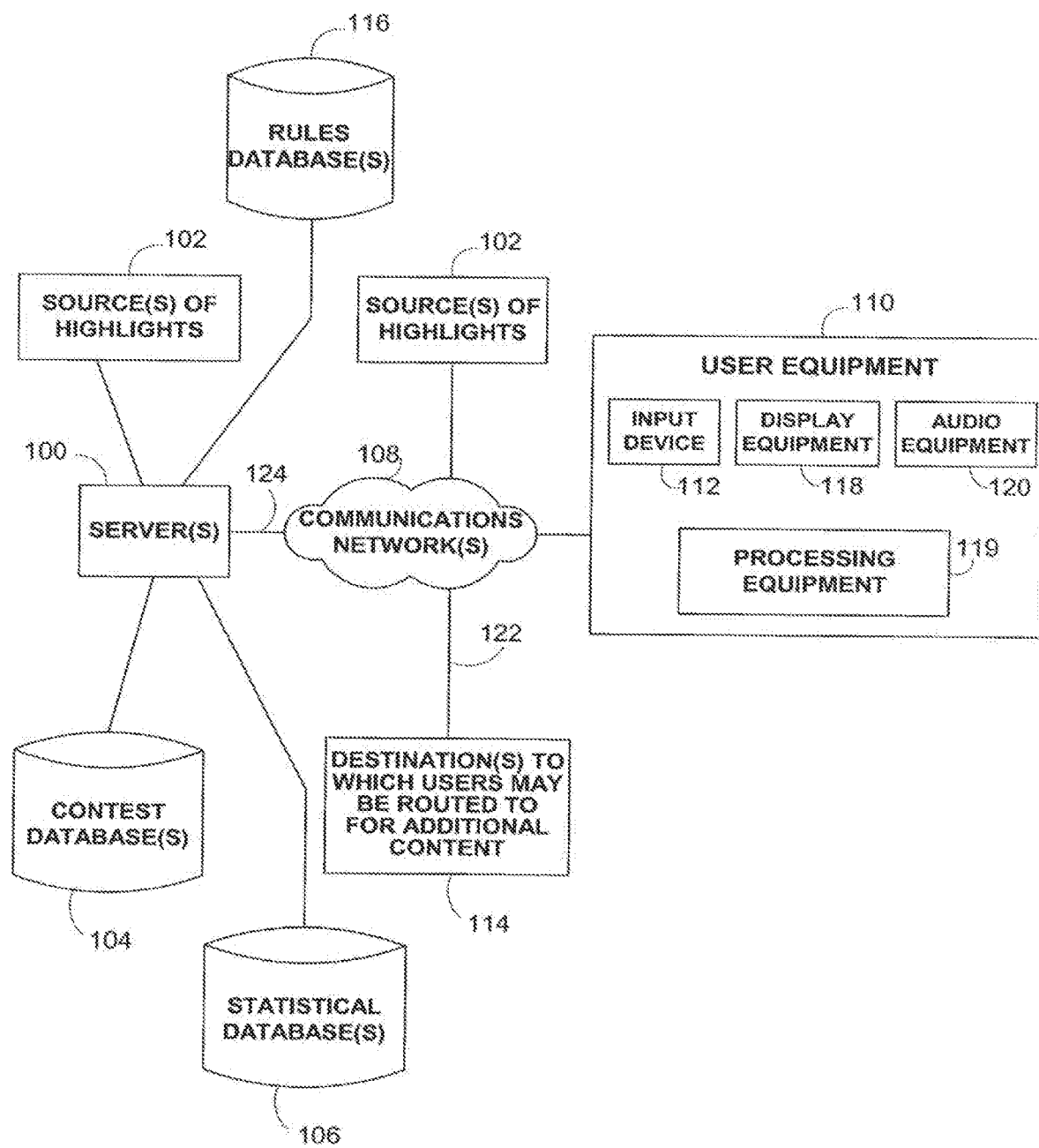
FIG. 1 is a diagram of an illustrative fantasy sports contest system in accordance with one embodiment of the present invention.

The present invention is primarily described herein in terms of the fantasy sports contest application. It will be understood that any other suitable software, hardware, or both may be used in conjunction with the fantasy sports contest application or in place of the fantasy sports contest application to implement some or all of the features of the present invention.

The fantasy sports contest application of the present invention may be any suitable software, hardware, or both that may be used to implement the features of the present invention. The fantasy sports contest application may be implemented at any suitable location in the system described in FIG. 1. For example, the fantasy sports contest application may be implemented at user equipment 110, at server 100, or at any other suitable location (that is not necessarily shown in FIG. 1), or at any combination of locations. For example, certain portions of the fantasy sports contest application may be implemented at user equipment 110 (e.g., those portions that implement features involved in user interaction), whereas certain other portions of the fantasy sports contest application may be implemented at server 100 (e.g., those portions that implement features involved in the processing of client requests and in the tracking of the performance of contestants). Any such suitable arrangement of the fantasy sports contest application may be implemented in accordance with the present invention.

The fantasy sports contest application of the present invention may be used to implement fantasy sports contests that include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting player positions, selecting reserves, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, multiple seasons, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). There are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest information. Fantasy sports contest information may include any suitable information associated with one or more fantasy sports contests in which the user participates or in which the user may have an interest. For example, fantasy sports contest information may include information regarding the user's one or more rosters, the user's standing in each of the fantasy sports contests in which the user participates, one or more point tallies that the user has accumulated in each of the user's respective fantasy sports contests, information regarding the number of trades the user may make, information regarding the amount of fantasy money the user has available to add players to a roster, information regarding deadlines to make trades or perform any other suitable task associated with one or more fantasy sports contests, or any other suitable information. Fantasy sports contest information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contest in which the user participates.

Aspects of the operation of fantasy sports contest applications are described in U.S. Pat. No. 4,918,603 (Hughes, et al.), U.S. Pat. No. 5,846,132 (Junkin), U.S. Pat. No. 5,971,854 (Junkin), and U.S. Pat. No. 6,193,610 (Junkin), which are all hereby incorporated by reference herein in their entireties.

An illustrative fantasy sports contest client/server system in accordance with the present invention is shown in FIG. 1. The system illustrated in FIG. 1 may be used as a fantasy sports contest system in accordance with the present invention. The fantasy sports contest application may be at least partially implemented on server 100. Server 100 may include one or more servers that may be located at a single location or across two or more locations (e.g., in a distributed network arrangement). Server 100 may access one or more databases (e.g., databases 104, 106 and 116) that may store information related to a fantasy sports contest.

Databases 104, 106, and 116 may store fantasy sports contest information such as the roster of players available for drafting, the schedule for the fantasy sports contest, fantasy sports contest rules, or any other suitable information related to the fantasy sports contest. Server 100 may also include source of highlights 102 for providing highlight segments and related information. Information from server 100 and source 102 may be transmitted to user equipment 110 via communication network 108. Communication network 108 may be a satellite network, a telephone network, an Internet network, a cable network, or any other suitable communication network. If it is desired to transmit video signals over communication network 108, a network that enables relatively high bandwidth transmission (e.g., cable network, satellite network) may be desirable.

The fantasy sports contest information transmitted by server 100 to user equipment 110 includes data which is communicated to users as part of the fantasy sports contest such as statistical information, rosters, standings, etc. The highlight segments transmitted by server 100 to user equipment 110 may include text, graphics, and video information. If desired, some of the fantasy sports contest information, highlight segments and related information may be provided using data sources at facilities other than server 100, which are directly connected to user equipment 110 via communications network 108.

For example, data related to tracking user interaction with the fantasy sports contest application may be communicated to a data collection location that is separate from server 100. Similarly, highlight segments may be generated and stored by a highlight segment facility that is separate from server 100.

Server 100 may distribute the fantasy sports contest application and related data as well as highlight segments and related data to user equipment 110 via communications network 108.

User equipment 110 at each user's location may include processing equipment 119. Processing equipment 119 may be based on a personal computer, a WebTV box, a personal computer television (PC/TV), a handheld computing device, a set-top box, or any other suitable equipment. Processing equipment 119 may be used to implement the fantasy sports contest application at the user's location. Alternatively, the fantasy sports contest application may be partially implemented on server 100 and partially implemented on processing equipment 119.

Fantasy sports contest information may be distributed to user equipment 110 periodically (e.g., once per hour or once per week). Fantasy sports contest information may also be distributed continuously or on-demand to user equipment 110. A connection may be established to server 100, and any sources of information independent from server 100 through communications network 108. The fantasy sports contest application may request certain fantasy sports contest information, highlight segments, and highlight segment related information to be sent from server 100 and independent sources. Server 100 may include a processor to handle these information distribution tasks. User processing equipment 119 may also include a processor and communications hardware to handle tasks associated with implementing a fantasy sports contest application, including requesting appropriate information from server 100.

At the user's location, display equipment 118 displays fantasy sports contest information and highlight segments. The fantasy sports contest information and highlight segments may include audio information. Audio equipment 120 may be used to output audio info. Audio equipment may include speakers found in televisions, speakers for personal computers, stand-alone stereo systems (e.g., mini-systems, component systems, etc.), or any other suitable audio equipment. The user may use input device 112 to access information related to the fantasy sports contest. Such input devices may include one or more suitable devices such as remote controls, keyboards, voice controlled devices, track balls, computer mice or any other suitable device.

A number of suitable techniques may be used to distribute video information for highlight segments. For example, highlight segment video information may be distributed from source 102 in a continuously-looped arrangement, where the fantasy sports contest application implemented on user processing equipment 119 may capture appropriate video information for display from the stream of information being transmitted. With such a continuously-looped arrangement, a map indicating the latest location of the video information may be downloaded periodically to user equipment 110. This allows any databases used in source 102 for storing video information to be updated, and also allows source of highlights 102 to be altered. Highlight segment video information may be downloaded to user equipment 110 periodically and stored locally. The video information may be accessed locally when needed by the fantasy sports contest application implemented (at least partially) using processing equipment 119 at the user's location. Another approach involves using the fantasy sports contest application to request video information when needed. Information on the location of video information may be downloaded to user equipment 110, and may be updated as needed. The fantasy sports contest application implemented (at least partially) using processing equipment 119 may then request and receive appropriate highlight segment video information as needed.

Text information for highlight segments may be provided to user equipment 110 using paths that are substantially equivalent to the paths used for distributing fantasy sports contest information. For example, text information may be stored locally in processing equipment 119 and updated periodically. Text information may also be provided by server 100 using a continuously-looped arrangement, or on request.

Figure 2:
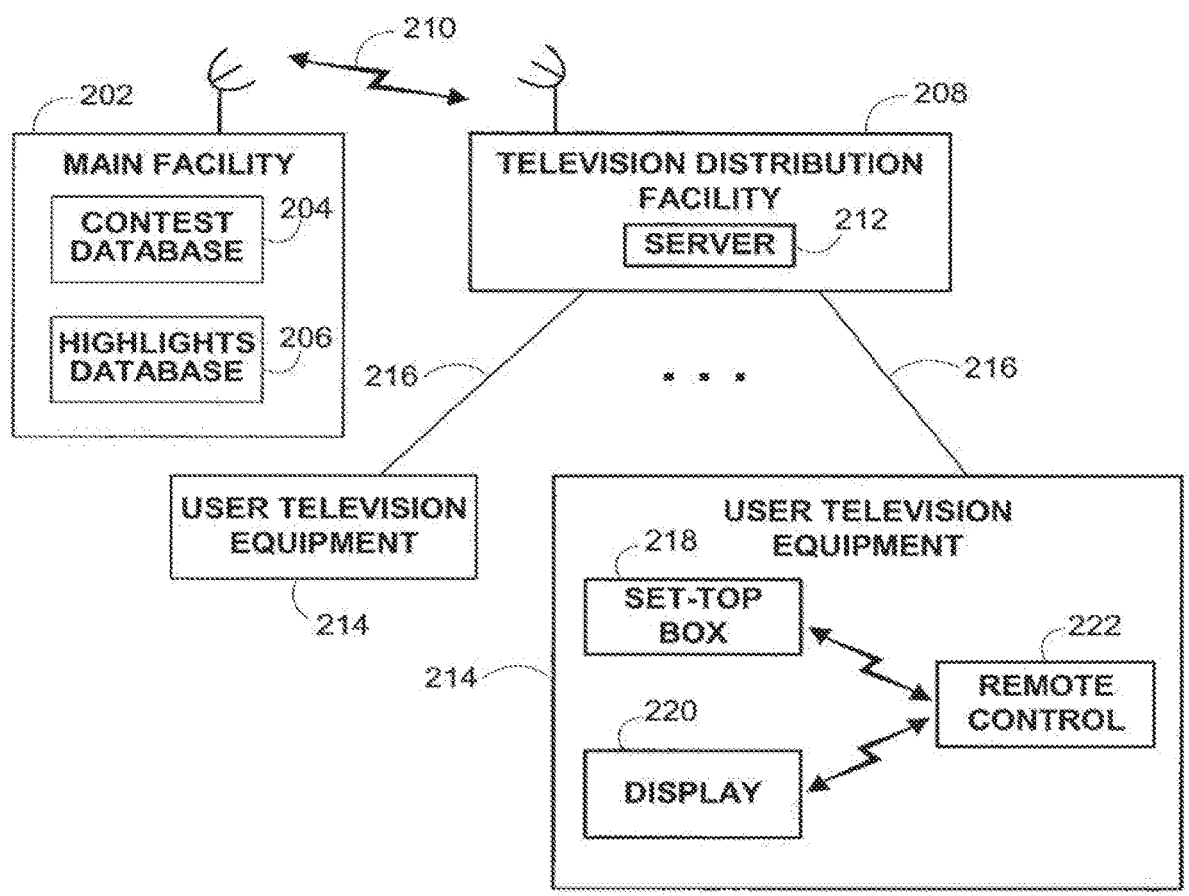
FIG. 2 is a diagram of an illustrative fantasy sports contest television system in accordance with one embodiment of the present invention.

In one embodiment, the fantasy sports contest application of the present invention may be implemented on an interactive television platform. An illustrative fantasy sports contest television system 200 in accordance with this embodiment of the present invention is shown in FIG. 2. Main facility 202 may include a fantasy sports contest database 204 for storing fantasy sports contest information such as the roster of players available for drafting, the schedule for the fantasy sports contest, rules, or any other suitable fantasy sports contest information. Main facility 202 may also include a highlight segment database 206 for storing highlight segments and related information. Information from databases 204 and 206 may be transmitted to television distribution facility 208 via communications link 210. Link 210 may be a satellite link, a telephone network link, an Internet link, a cable or fiber optic link, a microwave link, a combination of such links, or any other suitable communication link. If it is desired to transmit video signals (e.g., for highlight segments) over link 210 in addition to data signals, a relatively high bandwidth link such as a satellite link may be preferable to a relatively low bandwidth link such as a telephone line.

Television distribution facility 208 is a facility for distributing television signals to users, such as a cable system head end, a broadcast distribution facility, or a satellite television distribution facility.

The fantasy sports contest information transmitted by main facility 202 to television distribution facility 208 includes data which is communicated to users as part of the fantasy sports contest such as statistical information, rosters, standings, etc. The highlight segment related content transmitted by main facility 202 to television distribution facility 208 may include still images, text, graphics, audio and/or video content. If desired, some of the fantasy sports contest information and highlight segments information may be provided using data sources at facilities other than main facility 202. For example, data related to tracking player interaction with the fantasy sports contest application and other interactive applications may be communicated to a data collection location that is separate from main facility 202 and separate from television distribution facility 208. Similarly, highlight segments information may be obtained from a television network or a repository of multimedia and other content that is separate from main facility 202 and television distribution facility 208.

Regardless of its source, highlight segments may be maintained on a server 212 within television distribution facility 208 if desired. Server 212 may be capable of handling text, graphics, audio and video. In addition, server 212 may be capable of providing interactive services such as sending out video clips based on the user's selections. Server 212 may be based on one or more computers.

Television distribution facility 208 may distribute fantasy sports contest information and applications as well as the contents of highlight segments and the highlight segments application (e.g., in instances where the highlight segments application is not integrated as a feature of the fantasy sports contest application) to user television equipment 214 or other user equipment of multiple users via communications paths 216. This information may be distributed over an out-of-band channel on communications paths 216 and may be distributed using any of a number of suitable techniques. For example, still images and text may be distributed over an out-of-band channel using an out-of-band modulator. Multimedia highlight segments may also be distributed in this way, although large quantities of audio and video information may be more efficiently distributed using one or more digital channels on paths 216. Such digital channels may also be used for distributing text and graphics.

Each user may have a receiver such as set-top box 218 or other suitable television or computer equipment into which circuitry similar to set-top-box circuitry has been integrated. For clarity, the present invention is described primarily in connection with user equipment based on a set-top box arrangement. This is merely illustrative. The fantasy sports contest application of the present invention may be implemented using user television equipment 214 that is based on a personal computer, a WEBTV box, a personal computer television (PC/TV), or handheld computing device, etc. If desired, the fantasy sports contest application may be implemented using a client-server architecture using user television equipment 214 as a client processor and a server such as server 212.

A fantasy sports contest application may also be implemented in an on-line system using personal computers or other suitable equipment linked to a computer network (e.g., the Internet), a fantasy application interface (e.g., an Internet browser), and a media player (which, depending on the software chosen, may be a feature included in the fantasy sports contest application interface). With such an arrangement, fantasy sports contest application data and highlight segments may be stored remotely on a server that the user of the on-line fantasy sports contest application may access through an Internet connection and download locally. Server 212 need not be incorporated in a television distribution facility, communications paths 216 may be an Internet connection, and a basic personal computer with a browser or other suitable equipment could substitute for user television equipment client processor 214.

Fantasy sports contest information may be distributed to set-top boxes 218 periodically (e.g., once per hour or once per week). Fantasy sports contest information may also be distributed continuously or on-demand. A connection may be established to television distribution facility 208 using communication paths 216. A request for certain fantasy sports contest information or highlight segments may be sent from the set-top box 218 to the television distribution facility 208. The television distribution facility 208 may respond by sending information responsive to the request back to the set-top box 218 using communication paths 216.

Main facility 202 may include a processor to handle information distribution tasks. Each set-top box 218 may include a processor to handle tasks associated with implementing a fantasy sports contest application on the set-top box 218. Television distribution facility 208 may include a processor for tasks associated with monitoring the user's interactions with the fantasy sports contest application implemented on set-top boxes 218 and for handling tasks associated with the distribution of information related to the fantasy sports contest and highlight segments.

During use of the fantasy sports contest application implemented on set-top box 218, statistical information relating to the contest may be displayed on display 220. Set-top box 218, and display 220 (if part of a television) may be controlled by one or more remote controls 222 or any other suitable user input interfaces such as a wireless keyboard, mouse, trackball, dedicated set of buttons, etc.

Communication paths 216 preferably have sufficient bandwidth to allow television distribution facility 208 to distribute scheduled television programming, pay programming, and other information to set-top boxes 218 in addition to the fantasy sports contest application, related data, and highlight segments. Multiple television and audio channels (analog, digital, or both analog and digital) may be provided to set-top boxes 218 via communication paths 216. If desired, fantasy sports contest information and highlight segments may be distributed by one or more distribution facilities that are similar to, but separate from, television distribution facility 208 using communication paths that are separate from communication paths 216 (e.g., using Internet paths).

Certain functions such as the user's instructions to make a change in the user's team roster selections or the selection of a highlight segment for viewing may require set-top boxes 218 to transmit data to television distribution facility 208 over communication paths 216. If desired, such data may be transmitted over telephone lines or other separate communication paths. If functions such as these are provided using facilities separate from television distribution facility 208, some of the communication involving set-top boxes 218 may be made directly with the separate facilities.

A number of suitable techniques may be used to distribute highlight segments. For example, if each path 216 includes a number of traditional analog television channels, one or more of these channels may be used to support a number of digital channels. The bandwidth of each analog channel that is used to support digital channels may support ten or more of such digital channels. For on-demand highlight segments, set-top box 218 and server 212 may negotiate to determine a channel on which to provide the desired highlight segments. Highlight segments that originate from main facility 202 or a separate facility may be distributed to user television equipment 214 using these or other suitable techniques or a combination of such techniques.

Figure 3:
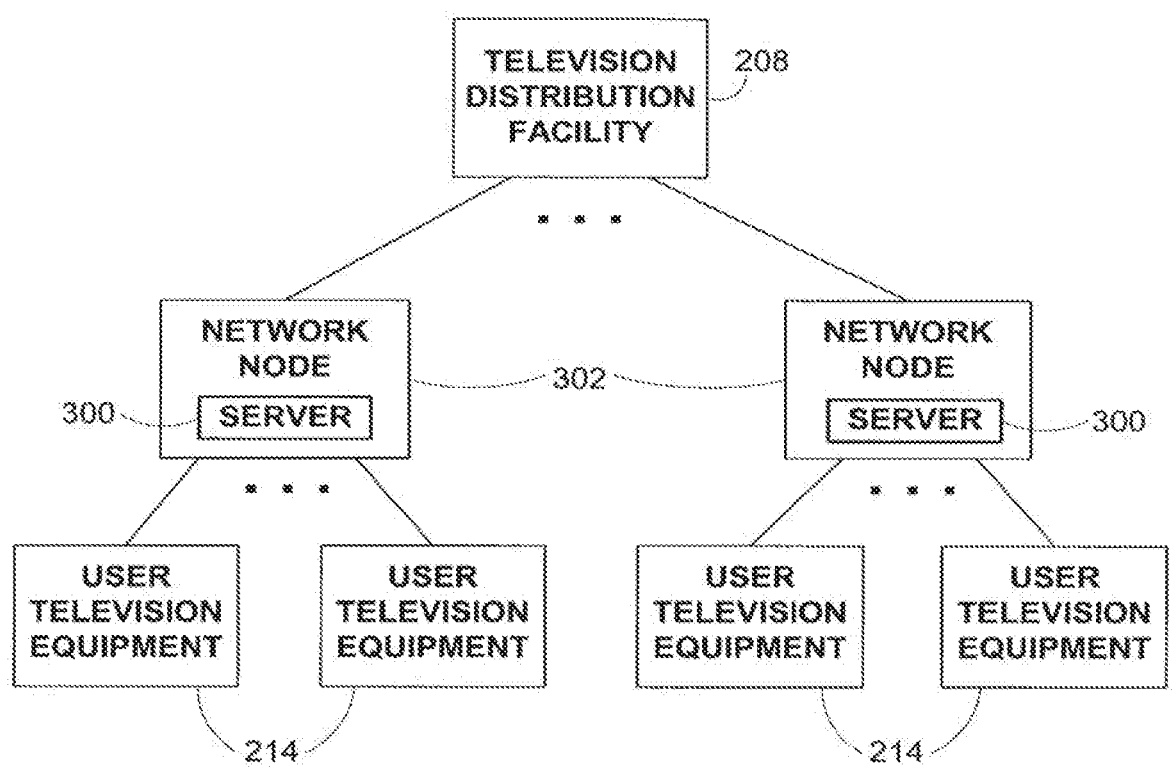
FIG. 3 is a diagram of an illustrative fantasy sports contest television system having network nodes in accordance with one embodiment of the present invention.

As shown in FIG. 3, the capabilities of server 212 may be provided using servers 300 located at network nodes 302. Servers such as servers 300 may be used instead of server 212 or may be used in conjunction with a server 212 located at television distribution facility 208.

Highlight segments may be downloaded periodically (e.g., every 30 minutes) to set-top boxes 218 of FIG. 2 and stored locally. The highlight segments to store may be based on information indicating which highlight segments relate to the user's fantasy sports contest team roster. Highlight segment video information may be accessed locally when needed by the fantasy sports contest application implemented using the set-top box 218. Alternatively, highlight segment video information may be provided in a continuously-looped arrangement on one or more digital channels on paths 216. With such a continuously-looped arrangement, a map indicating the location of the latest video information may be downloaded periodically to set-top boxes 218 (e.g., every thirty minutes). This allows the content on the digital channels to be updated. The fantasy sports contest application implemented (at least partially) on set-top boxes 218 may use the map to locate desired highlight segments on the digital channels. Another approach involves using a server such as server 212 or servers 300 to provide the highlight segments on request (e.g., after set-top box 218 and the server have negotiated to set up a download operation). A bitmap or other suitable set of video information may then be downloaded from the server to the set-top box. If desired, the server may provide instructions to the set-top box informing the set-top box where the desired highlight segments may be located on a particular digital channel. The highlight segments may be updated periodically if the server responsible for informing the set-top box of the location of the highlight segments is also updated periodically.

Text information used with highlight segments may be provided to set-top boxes 218 using paths substantially equivalent to paths used for distributing fantasy sports contest information. For example, highlight segments related text information from database 206 may be provided to set-top boxes 218 using link 210, television distribution facility 208, and paths 216. The text information may be stored locally in set-top boxes 218 and updated periodically (e.g., every thirty minutes). Text information may also be provided by server 212 using a continuously-looped arrangement or on request.

A cable modem may be used to distribute text, graphics, audio and video data. The text, graphics, audio and video content may also be distributed using a combination of these techniques or any other suitable technique.

With regard to the interactive television system of FIG. 2, the fantasy sports contest application may be implemented user television equipment 214, at television distribution facility 208, at main facility 202, or at any other suitable location (that is not necessarily shown FIG. 2), or at any combination of locations. For example, certain portions of the fantasy sports contest application may be implemented at user television equipment 214, (e.g., those portions that implement features involved in user interaction), whereas certain other portions of the fantasy sports contest application may be implemented at television distribution facility 208 (e.g., those portions that implement features involved in the processing of client requests and in the tracking of the performance of contestants). Any such suitable arrangement of the fantasy sports contest application may be implemented in accordance with the present invention.

The fantasy sports contest application of the present invention may also provide as part of fantasy sports contest information, highlight segments of real-life sporting events. A highlight segment may include any suitable form of media. For example, a highlight segment may include static images, animated images, video, audio, rendered images, interactive content, text, any other suitable form of media, or any other suitable combination thereof. Highlight segments may include corresponding television segments, radio accounts of the relevant play, or both. Highlight segments may be provided by one or more third party suppliers (e.g., NFL Films) of accounts and depictions of a game, which may provide highlight segments from one or more camera angles.

Highlight segments may be stored in a database of highlight segments at, for example, source of highlights 102 or highlights database 206. Highlight segments may be stored as individual media files. In this case, the highlight segments may be identified by file header information or by any other such suitable technique. Alternatively, highlight segments may be stored as part of an entire event recording (e.g., an entire football game video and audio). In this case, the highlight segments may be tagged in some appropriate way in order to allow the fantasy sports contest application to distinguish between different highlight segments of a particular event. For example, a separate file that identifies the locations within each of the events of every highlight segment may be used by the fantasy sports contest application to find a particular highlight segment.

It will be understood that any such technique for storing, searching, and accessing highlight segments may be used in conjunction with the present invention.

A multimedia highlight segment may be a computer media file with audio and video information, a television audio and video signal, as well as other suitable media content. A multimedia highlight segment may be downloaded or streamed to the user equipment.

FIG. 4 shows fantasy sports contest information screen 400 provided by the fantasy sports contest application. Screen 400 may include fantasy sports contest information such as information on the user's fantasy sports contest team roster, information on one or more recent fantasy sports contests (e.g., between two fantasy sports contest teams) involving one or more members of the user's fantasy sports contest roster, information on a fantasy sports contest league including the user's fantasy sports contest team, or any other information related to a fantasy sports contest.

A Highlight Center element 420 may be displayed in screen 400 having links to individual highlight segments, or compilations of highlight segments. As shown in FIG. 4, screen 400 includes information on a recent fantasy sports contest (e.g., between two fantasy sports contest teams) involving the user's fantasy sports contest team (i.e., roster), including the two opposing fantasy sports contest teams' names, team point totals, and the name, position, statistics, and fantasy sports contest point totals of each athlete.

Selectable elements 402/404/406 may be displayed in screen 400 as selectable overlays on the fantasy sports contest information. In this particular example, elements 402 represent individual athletes, elements 404 represent athletic positions, and elements 406 represent fantasy sports contest teams. Selectable elements 402/404/406 provide links to highlight segments featuring the athlete or grouping of athletes represented by the underlying fantasy sports contest information on which selectable elements 402/404/406 are overlaid. For example, in FIG. 4 selectable element 406 overlaid on the fantasy sports contest team name "Masters" may represent highlight segments featuring the athletes on the Masters fantasy sports contest team. Whereas selectable element 402 overlaid on the athlete's name "J. Elway" may represent highlight segments featuring the athlete J. Elway, and element 404 overlaid on the athletic position "QB" may represent highlight segments featuring athletes at the quarterback position. Also shown in FIG. 4, navigation indicator 410 may be controlled by the user to highlight a particular selectable element 402/404/406 to which the user has navigated.

Figure 6:
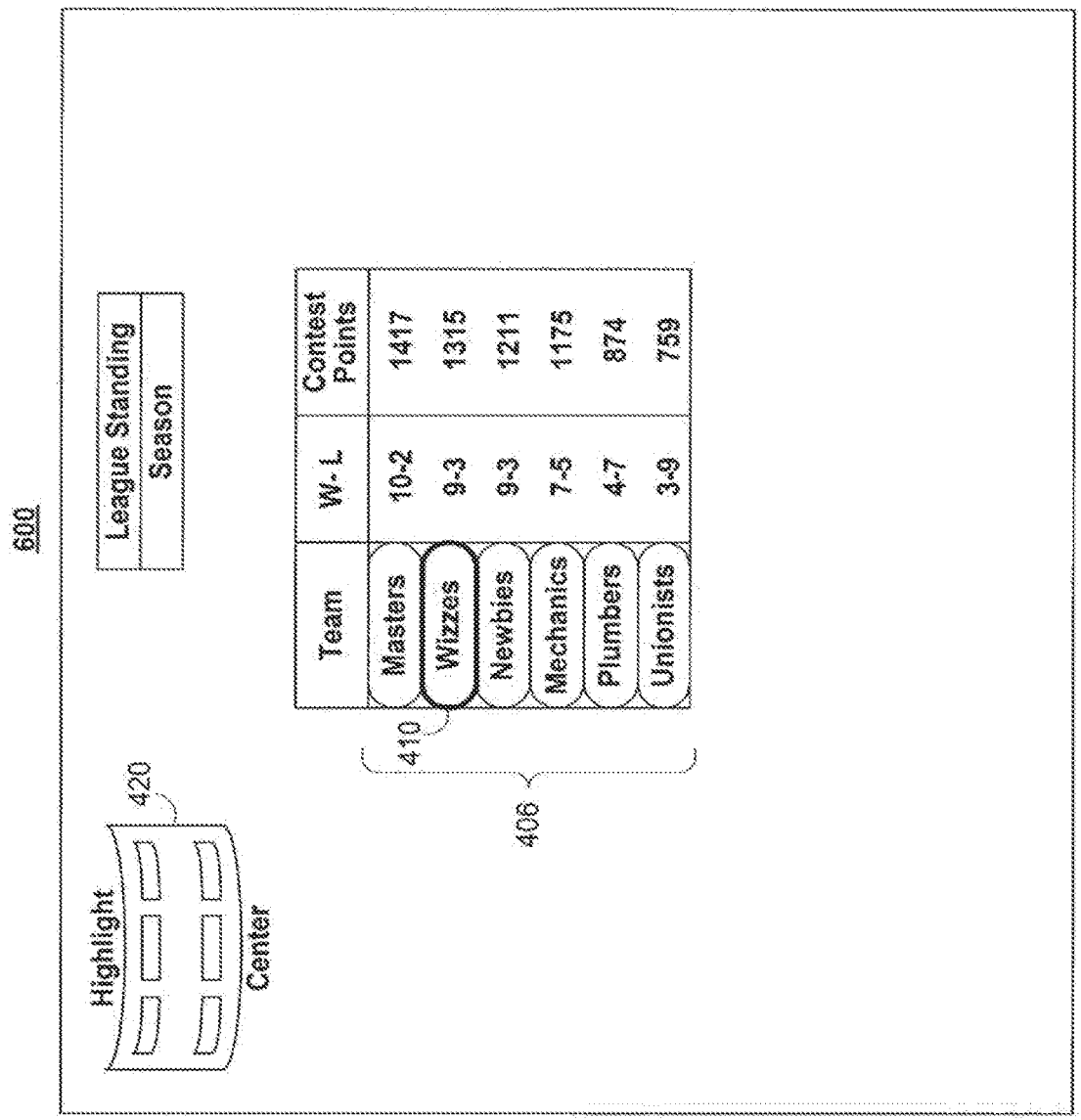

FIGS. 5 and 6 show illustrative display screens that may be generated by the fantasy sports contest application having different fantasy sports contest information. FIG. 5 shows screen 500 having cumulative fantasy sports contest information for athletes on the user's fantasy sports contest roster over an entire season. FIG. 6 shows fantasy sports contest information on the user's fantasy sports contest league standings for an entire season.

In one suitable approach, the scope of the highlight segments represented by selectable elements 402/404/406 may vary according to the type of fantasy sports contest information being displayed in the display screen. For example, in the context of the fantasy sports contest information displayed in FIG. 4, which concerns a recent fantasy sports contest between two fantasy sports contest teams, the highlight segments represented by selectable elements 402/404/406 may be drawn from that particular contest only. Whereas in the context of FIGS. 5 and 6, both of which provide cumulative fantasy sports contest information on the user's fantasy sports contest team for a current season, the highlight segments represented by selectable elements 402/404/406 may be drawn from the current season.

Figure 7:
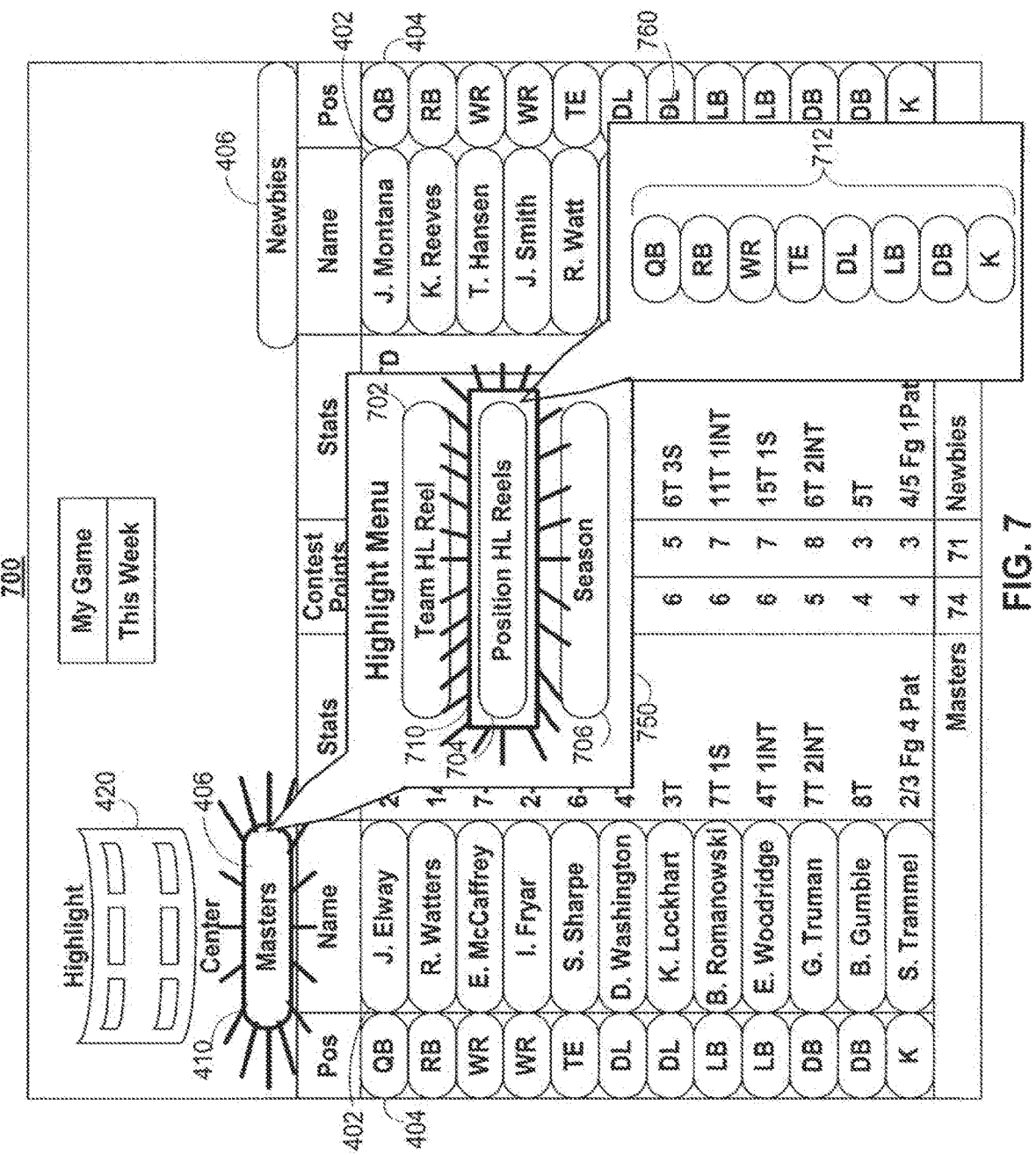
FIG. 7 shows an illustrative fantasy sports contest highlight menu in accordance with one embodiment of the present invention.

In another suitable approach, user selection of selectable elements 402/404/406 may cause the fantasy sports contest application to display a menu such as highlight menu 750 as shown in FIG. 7. Highlight menu 750 may enable the user to control the scope from which the represented highlight segments are drawn, and may enable the user to choose between highlight segments of multiple athletes, or multiple groupings of athletes that may be represented by the selected element 402/404/406.

As illustrated in FIG. 7, user selection of selectable element 406 representing the fantasy sports contest team "Masters" may cause the fantasy sports contest application to display highlight menu 750. Highlight menu 750 may provide links to groups of highlight segments featuring athletes on the Masters team. All athletes on the Masters team may be represented as a single group (e.g., using element 702), or athletes may be separated into groups using suitable criteria, such as by athletic position. As illustrated in FIG. 7, the fantasy sports contest application may provide menu 750 upon user selection of menu element 704. Menu element 704 may represent highlight elements featuring groups of athletes categorized by a criteria, such as groups of athletes on the Masters team categorized by athletic position. User selection of element 704, may cause the fantasy sports contest application to display a further highlight menu 760 having further selectable menu elements 712 that represent highlight segments featuring each categorized group of athletes.

Menu 750 may also provide toggle element 706 which may be used by the user to control the scope from which represented highlight segments are drawn. The user may toggle element 706 between selections such as "My Contest," "Last Week," "Season," etc. to control the pool of highlight segments from which highlight segments are being drawn. For example, user selection of element 702 while element 706 is toggled to "Season" may cause the fantasy sports contest application to draw highlight segments featuring athletes on the Masters team from the current season.

Figure 8:
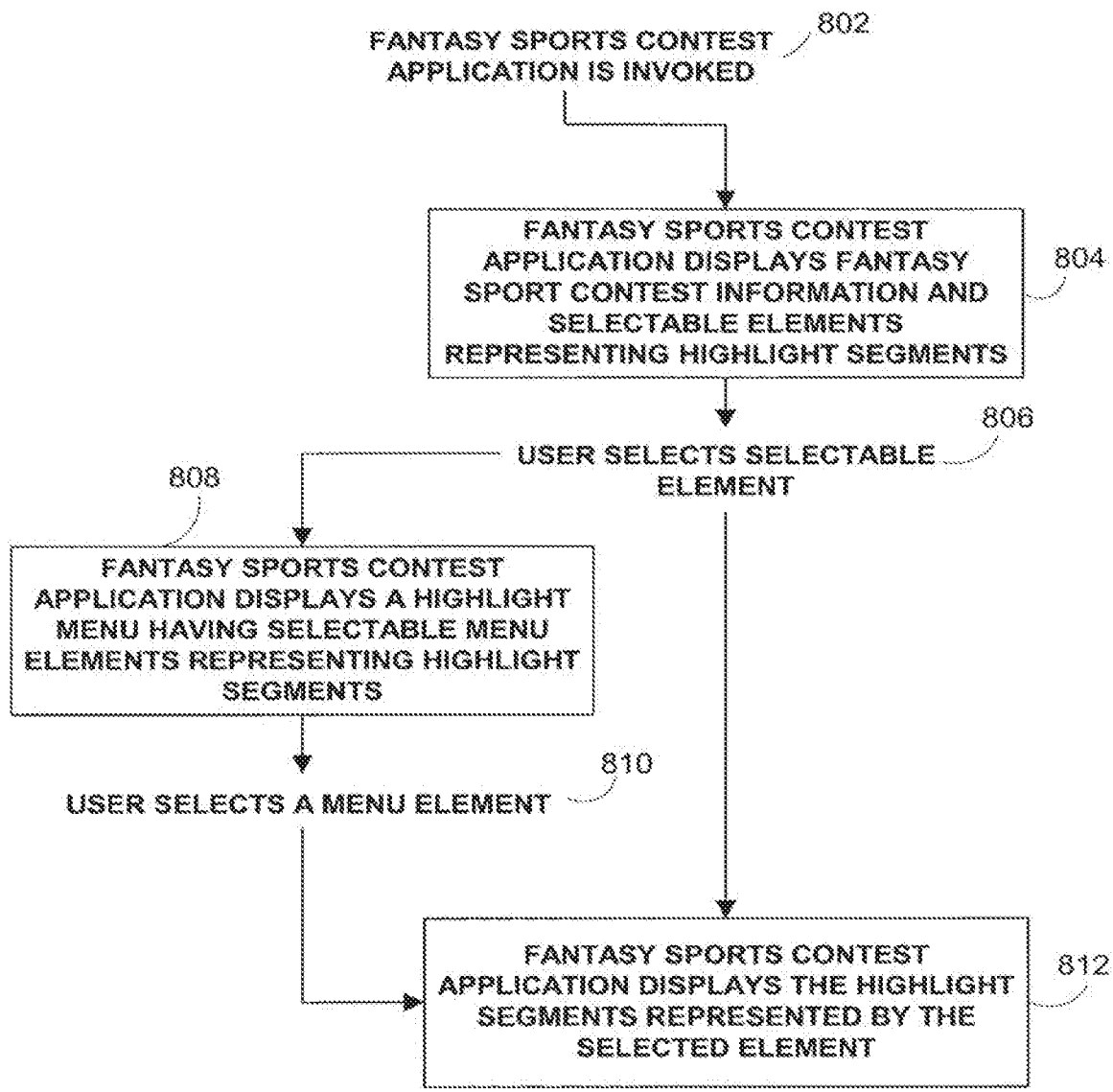
FIG. 8 is a flow chart of illustrative steps involved in displaying highlight segments based on a user selection in accordance with one embodiment of the present invention.

FIG. 8 is a flow chart of illustrative steps involved in displaying a highlight segment to the user. After the fantasy sports contest application is invoked (step 802), the fantasy sports contest application may display to the user fantasy sports contest information and selectable elements representing highlight segments available for viewing (step 804). If the user selects a selectable element (step 806), the fantasy sports contest application may directly display the highlight segments represented by the selectable element to the user (step 812). Alternatively, the fantasy sports contest application may display a highlight menu having selectable menu elements, which may provide links to subsets of highlight segments (step 808). User selection of a menu element (step 810) causes the fantasy sports contest application to display the represented highlight segments to the user (step 812).

Thus, highlight segments may be displayed by user selection of selectable elements 402/404/406 or by user selection of selectable menu elements if a highlight menu is displayed.

Figure 9:
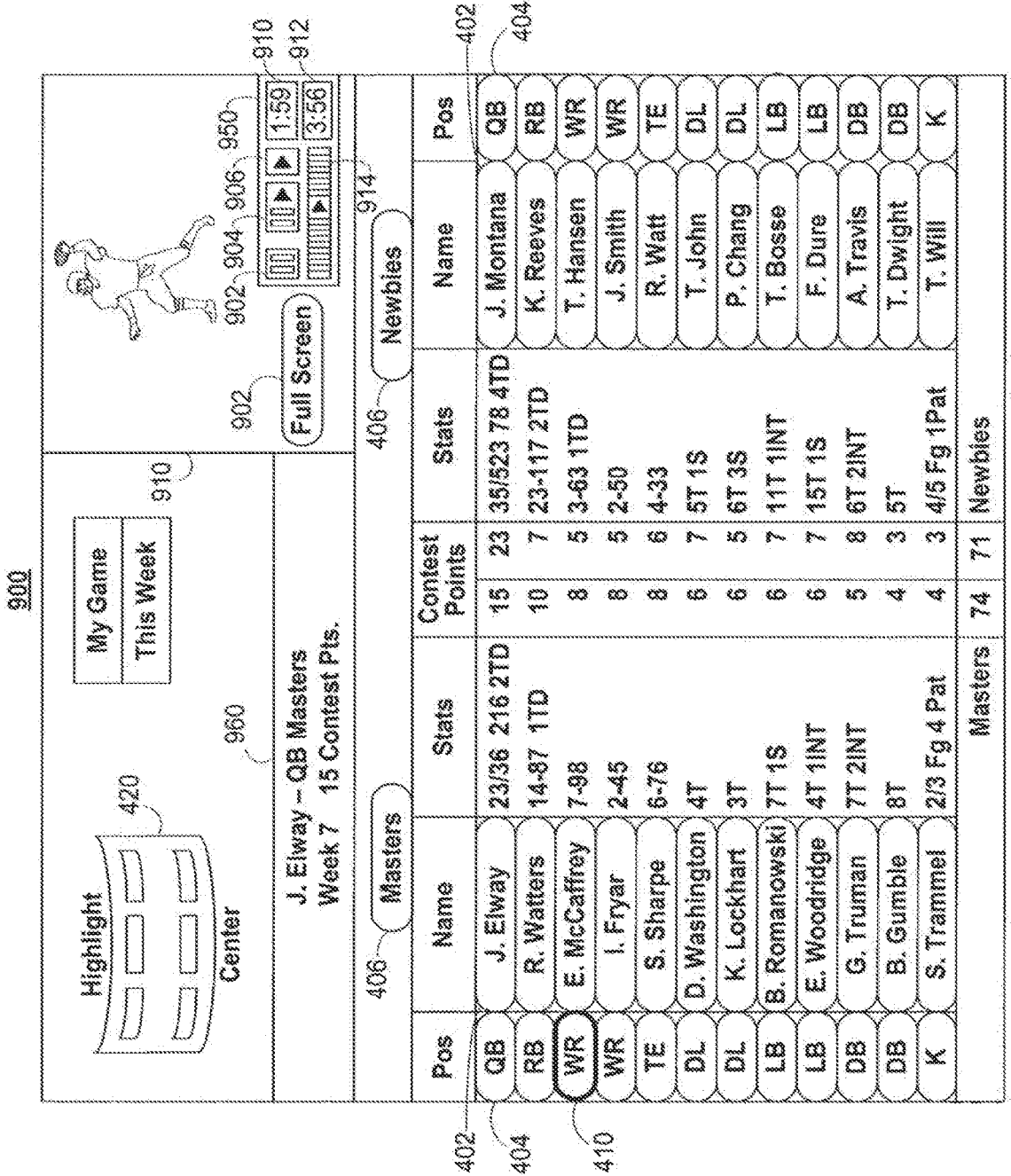
FIG. 9 shows an illustrative inset screen that may be used to present multimedia highlight segments in accordance with one embodiment of the present invention.

As illustrated in FIG. 9, the fantasy sports contest application may display a highlight segment to the user in an inset screen 910. In addition to inset screen 910, display screen 900 may also present fantasy sports contest information in a manner similar to FIG. 4, as an example. The user may able to select highlight segments for viewing as described above using selectable elements overlaid on fantasy sports contest information and selectable highlight menus elements, if any. The user may also be able to select further highlight segments for viewing while displaying a highlight segment in the inset screen 910. If the user selects another highlight segment for viewing during the display of a highlight segment, the segment currently playing may be interrupted in favor of the newly selected highlight segment. In another suitable arrangement, the newly selected segment may be queued for display after the current segment. Similarly, any further selected segments would be queued in the order they were selected.

Figure 10:
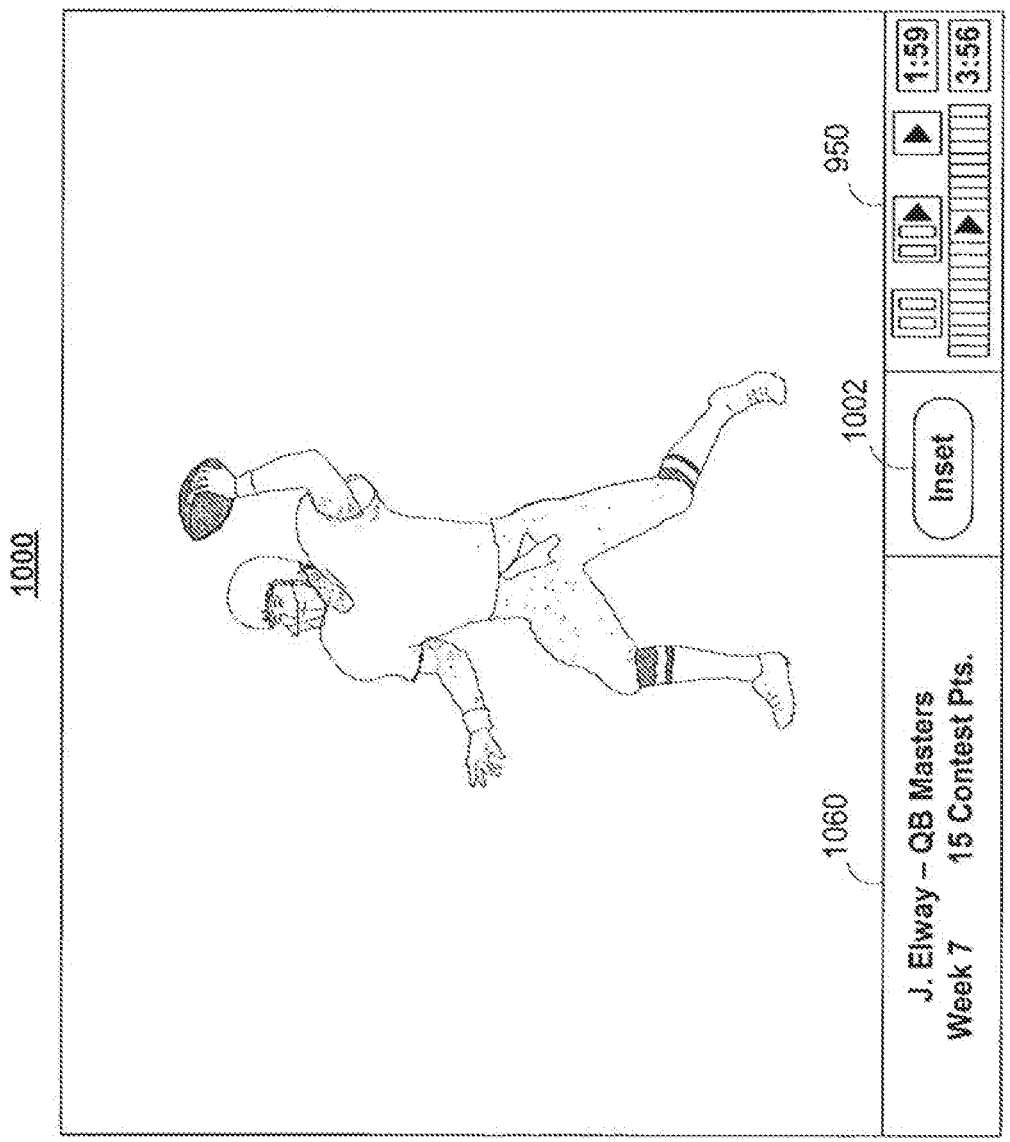
FIG. 10 shows an illustrative full screen that may be used to present multimedia highlight segments in accordance with one embodiment of the present invention.

As illustrated in FIG. 10, the fantasy sports contest application may display highlight segments using a full screen format. A toggle button 1002 may be provided in display 1000 for switching the view back to an inset screen (FIG. 9). Similarly, toggle button 902 may be provided in inset screen 950 to enlarge the view to the full screen.

Figure 11:
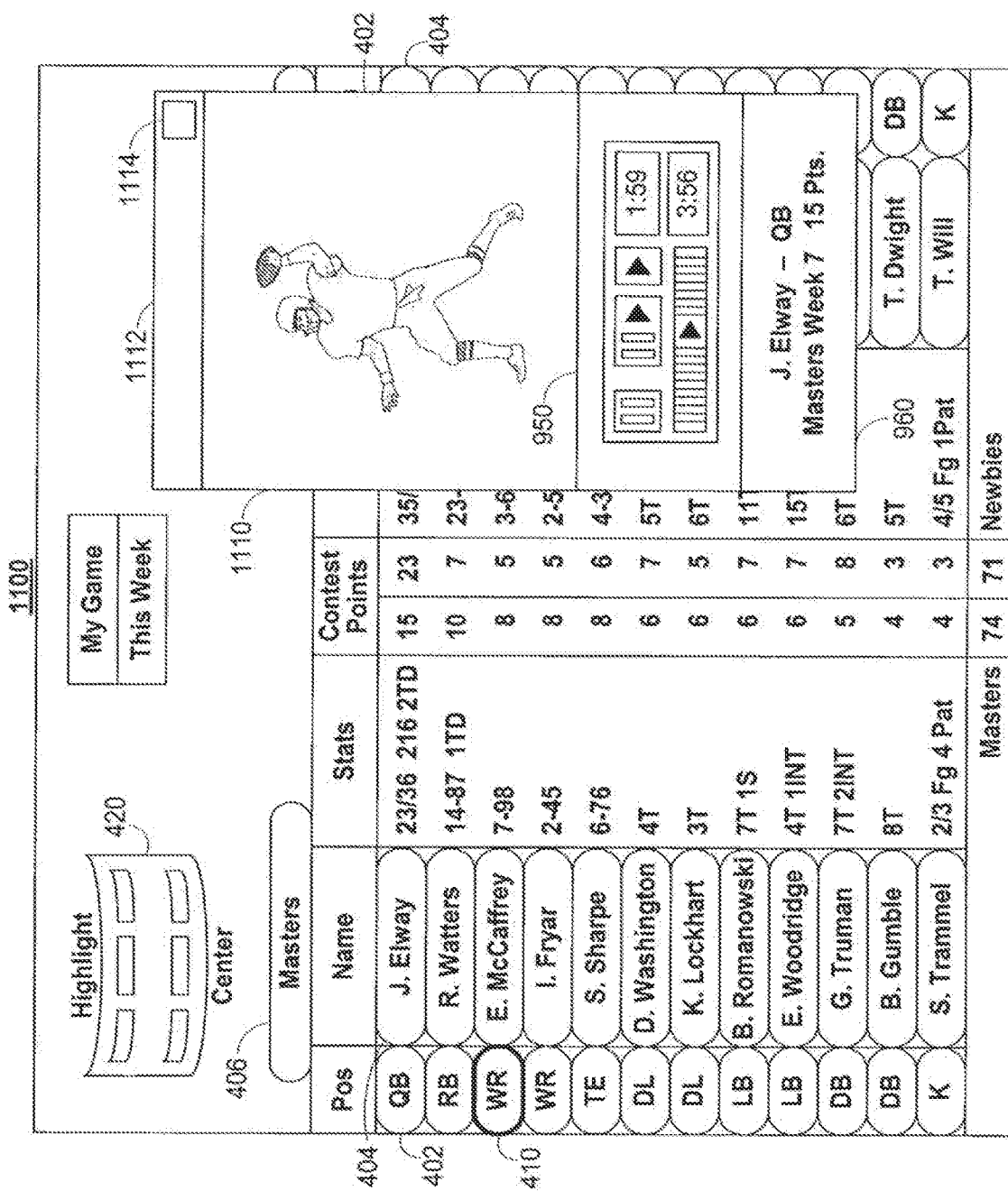
FIG. 11 shows an illustrative display window that may be used to present multimedia highlight segments in accordance with one embodiment of the present invention.

Alternatively, highlight segments may be displayed using a "pop-up" style display region, which may be in the form of a display window. As illustrated in FIG. 11, display screen 1100 may display fantasy sports contest information in a manner similar to FIG. 4 as an example. Upon user selection of highlight segments for display, region 1110 may be displayed playing the selected highlight segments. The user may use movement bar 1112 and selectable element 1114 to respectively move region 1110 within screen 1100 and close window 1110 (e.g., using a mouse, cursor keys on a remote control, or using any other suitable user input device).

Figure 12:
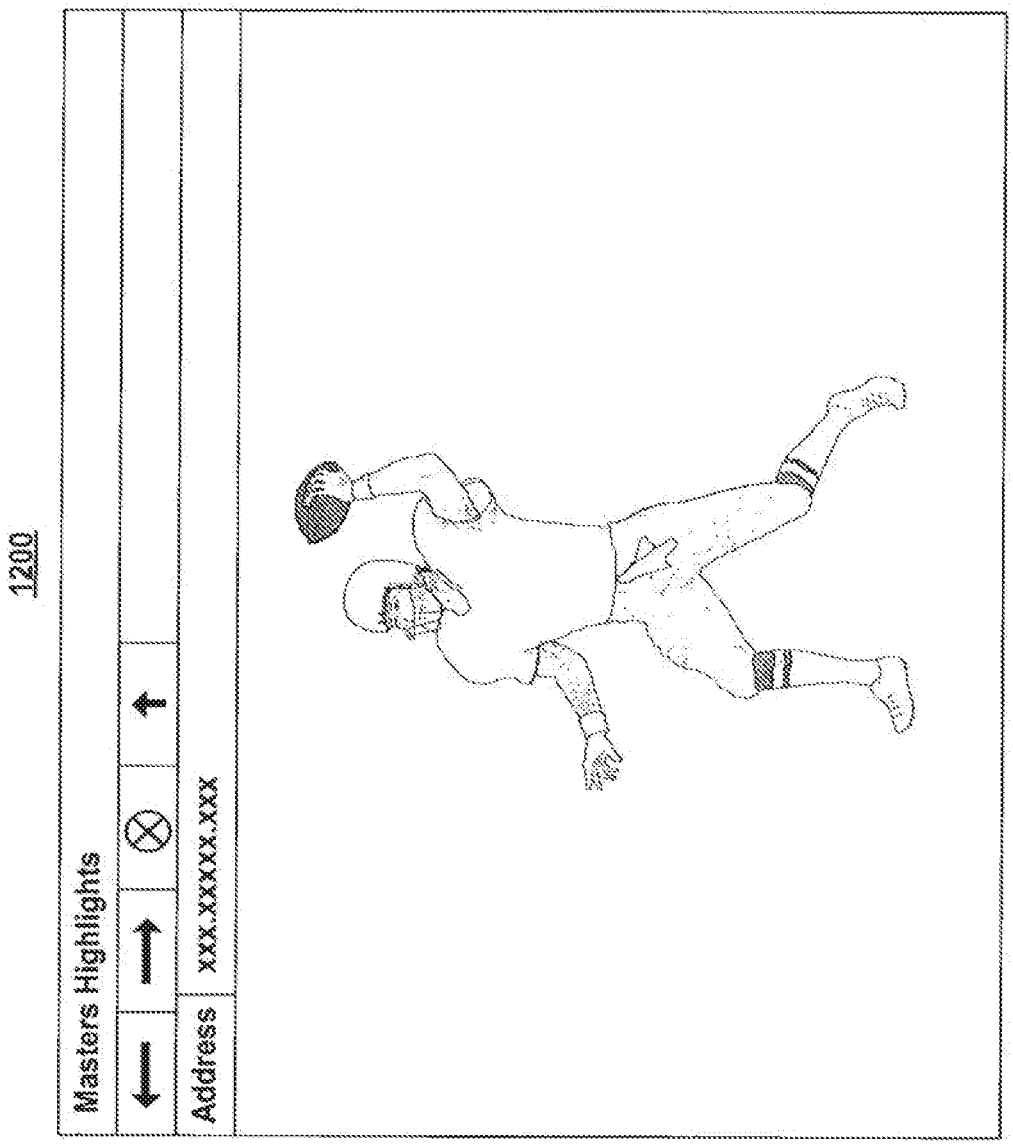
FIG. 12 shows an illustrative web browser application display that may be used to display multimedia highlight segments in accordance with one embodiment of the present invention.

In another suitable approach, illustrated in FIG. 12, user selection of highlight segments may cause the fantasy sports contest application to invoke an Internet web browser application (e.g., Microsoft Explorer™) to download and display the appropriate highlight segments. In one arrangement, the web browser application may download highlight segments from server 212 at television distribution facility 208. Alternatively, the web browser application may directly access an Internet web site, which may be maintained by a third party, to download the highlight segments. Highlight segments may be displayed to the user using any suitable multimedia application (e.g., Quicktime™) implemented using the web browser application. In one suitable approach, the fantasy sports contest application may be configured to display Web pages and to display certain standardized video streams and video files, thus not requiring third party applications.

As illustrated in FIGS. 9-11, the fantasy sports contest application may provide display control tool 950 to the user for controlling the display of highlight segments. As shown in FIG. 9, display control tool 950 may include control buttons 902, 904, and 906 that enable the user to, respectively, pause the highlight segment, play the segment in slow motion, and resume normal playback of a segment from either the pause or slow motion mode. The display control tool 950 may also include a display bar 914 that may allow the user to select a specific point in the highlight segment to begin playback, and may also serve as a tool for jumping forward or jumping back within the highlight segment. Display control tool 950 may also include time displays 910 and 912, which may display, respectively, the elapsed and total time of the highlight segment.

In one suitable arrangement, illustrated by FIG. 13, an identification screen 1300 may be displayed before each highlight segment, or sequence of highlight segments. The identification screen may include information on the subject of the ensuing highlight segment, such as name of the athlete featured, athletic position of the featured athlete, name of the featured athlete's fantasy sports contest team, and the round of fantasy sports competition the highlight segment is drawn from. The identification screen may also include information on fantasy sports contest points earned by the athlete, either in that round of fantasy sports competition, or in the ensuing real-life action depicted by the highlight segment, or sequence of highlight segments. In a sequence of highlight segments featuring more than one subject, an identification screen may be interjected before each subsequence of highlight segments featuring a different subject (e.g., a different athlete, a different fantasy sports contest team, or a different real-life team). Alternatively, in a sequence of highlight segments, an identification screen may be interjected before each highlight segment depicting a different real-life play.

In another suitable approach, the fantasy sports contest application may display the information displayed in display screen 1300 inconspicuously while the highlights are being displayed. For example, the information may displayed as a semi-transparent overlay. Alternatively, the information may be displayed in a small area of the display region in which the highlights are displayed. Any such suitable technique may be used for displaying the highlight information. For example, with reference to FIGS. 9-11, the fantasy sports contest application may display reduced size identification banner 960 simultaneously with the display of highlight segments. Identification banner 960 may include information substantially equivalent to the information displayed in identification screen 1300, and may be used to identify highlight segments in a substantially equivalent manner as identification screen 1300. Identification banner 960 may be displayed for a predefined amount of time (e.g., a particular number of seconds) during the beginning of a highlight segment, during the entirety of a highlight segment, or may be displayed according to any other suitable method.

Figure 14:
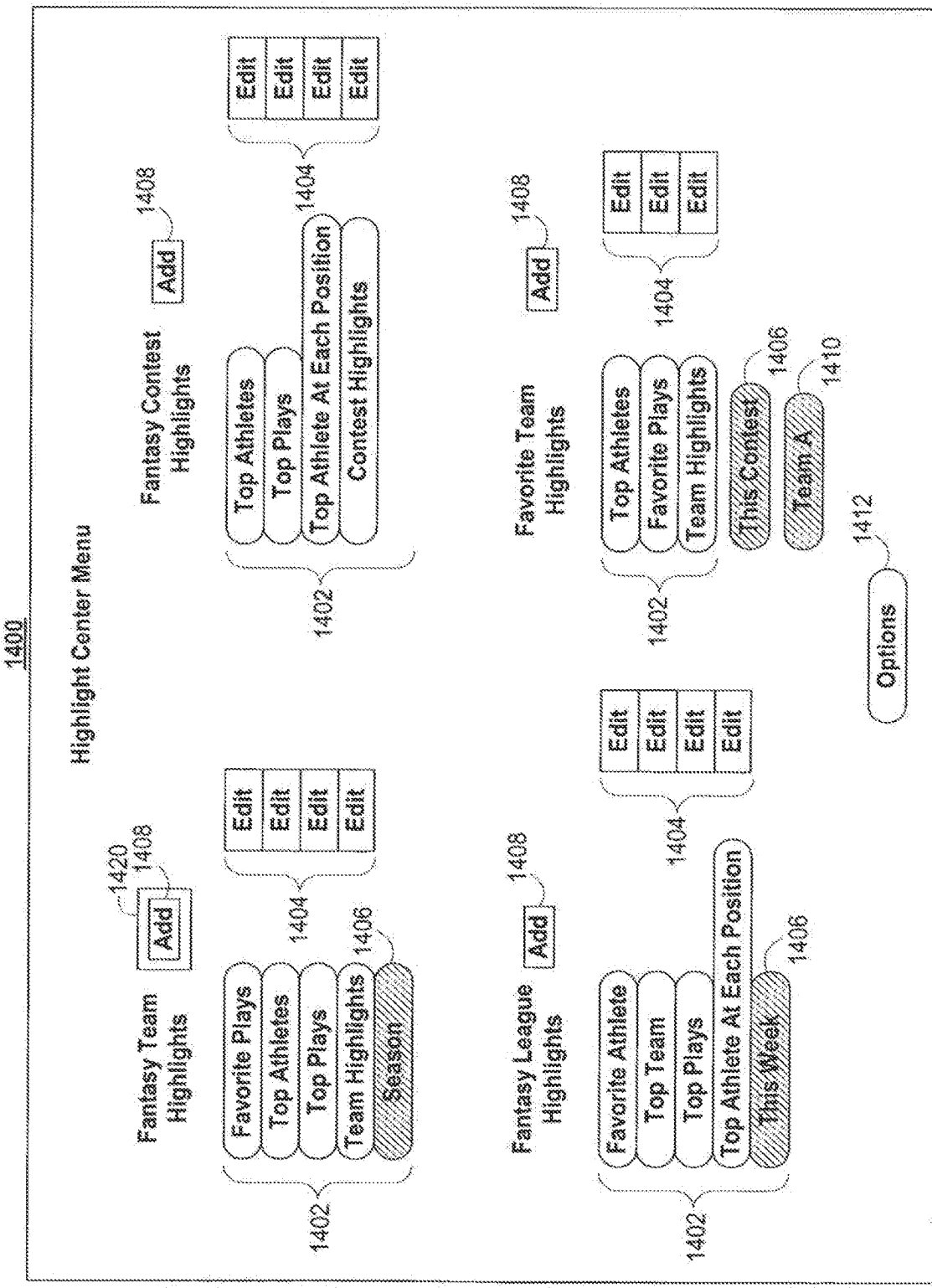
FIG. 14 shows an illustrative Highlight Center menu that may be displayed by the fantasy sports contest application in accordance with one embodiment of the present invention.

In one embodiment of the present invention, the fantasy sports contest application may present compilations of highlight segments to the user through a Highlight Center. As illustrated in FIG. 14, user selection of Highlight Center 420 (e.g., as shown in FIGS. 4-7, 9, and 11) may cause the fantasy sports contest application to display Highlight Center menu 1400 having selectable elements 1402 that represent the compilations of highlight segments. One or more navigational highlight elements 1420 may be displayed in menu 1400 to indicate a selected element. User selection of selectable element 1402 may cause the fantasy sports contest application to display the corresponding highlight segment compilation to the user in a manner substantially equivalent to the manner highlight segments are displayed in FIGS. 9-12.

A highlight segment compilation may be a collection of highlight segments organized around a central subject or theme. The central subject or theme may be selected based on performance considerations, such as a group of top athletes, a group of top plays, a top fantasy sports contest team, or based on any other suitable criterion. The central subject or theme may be selected based on the user's preference or interest, such as a user-specified favorite athlete, a user-specified type of favorite play, the user's fantasy sports contest team, etc. Highlight segments included in a highlight segment compilation may depict real-life action that involve the central subject or theme. For example, the fantasy sports contest application may provide compilations of highlight segments featuring the top performing athletes on the user's fantasy sports contest team roster, the top plays in the user's recent fantasy contest (e.g., against another fantasy sports contest team), or favorite plays from action in the user's fantasy league.

Figure 15:
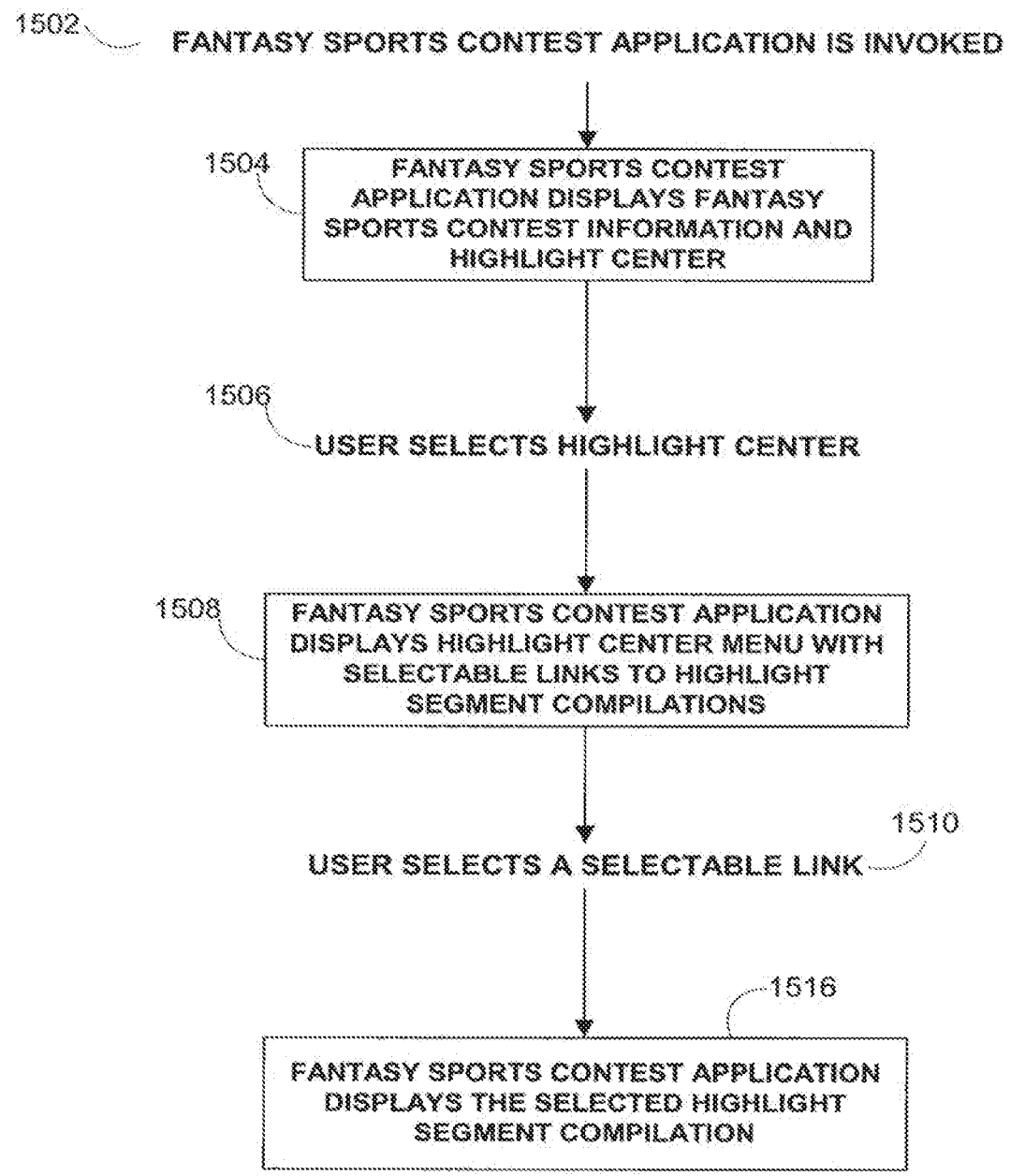
FIG. 15 shows a flow chart of illustrative steps involved in displaying highlight segment compilations in accordance with one embodiment of the present invention.

FIG. 15 is a flow chart describing the function of an illustrative Highlight Center. First, the fantasy sports contest application is invoked (step 1502). The fantasy sports contest application displays fantasy sports contest information and the Highlight Center element to the user (step 1504). User selection of the Highlight Center element (step 1506) causes the fantasy sports contest application to display the Highlight Center menu (step 1508) having selectable links to highlight segment compilations. User selection of a selectable link (step 1510) may cause the fantasy sports contest application to directly display the compilation (step 1516).

In one suitable approach, menu 1400 may include submenus that group highlight segment compilations by the scope of the compilations. For example, as illustrated in FIG. 14, the "Fantasy Team Highlights" submenu may list compilations of highlight segments featuring the athletes on the user's fantasy sports contest team roster, the "Fantasy Contest Highlights" submenu may list compilations of highlight segments featuring the athletes impacting a recent fantasy sports contest (e.g., against another fantasy sports contest team) involving the user's fantasy sports contest team, and the "Fantasy League Highlights" submenu may list compilations of highlight segments featuring athletes from all team rosters in a fantasy sports contest league. It will be understood that highlight segment compilations are modified by the submenu heading they are listed under. For example, a "Top Plays" highlight segment compilation listed under the "Fantasy Contest Highlights" submenu may represent a compilation of highlight segments featuring the top plays in the user's recent fantasy sports contest.

In one suitable approach, the fantasy sports contest application may enable the user to choose the time period from which highlight segments are drawn for highlight segment compilations. As illustrated in FIG. 14, the fantasy sports contest application may provide toggle element 1406 under a submenu to enable the user to choose a time period (e.g., "This Contest," "This Week," and "Season") for drawing highlight segments for the highlight segment compilations listed under the submenu. For example, a "Season" scope may cause the fantasy sports contest application to parse the highlight segment compilations listed under the submenu from the entire season's pool of highlight segments. Other choices such as "This Contest," and "This Week," may similarly define the time period from which highlight segments may be drawn. These choices are merely illustrative, other suitable choices may be provided that may be customized according to the schedule of a real-life sports league.

Figure 16:
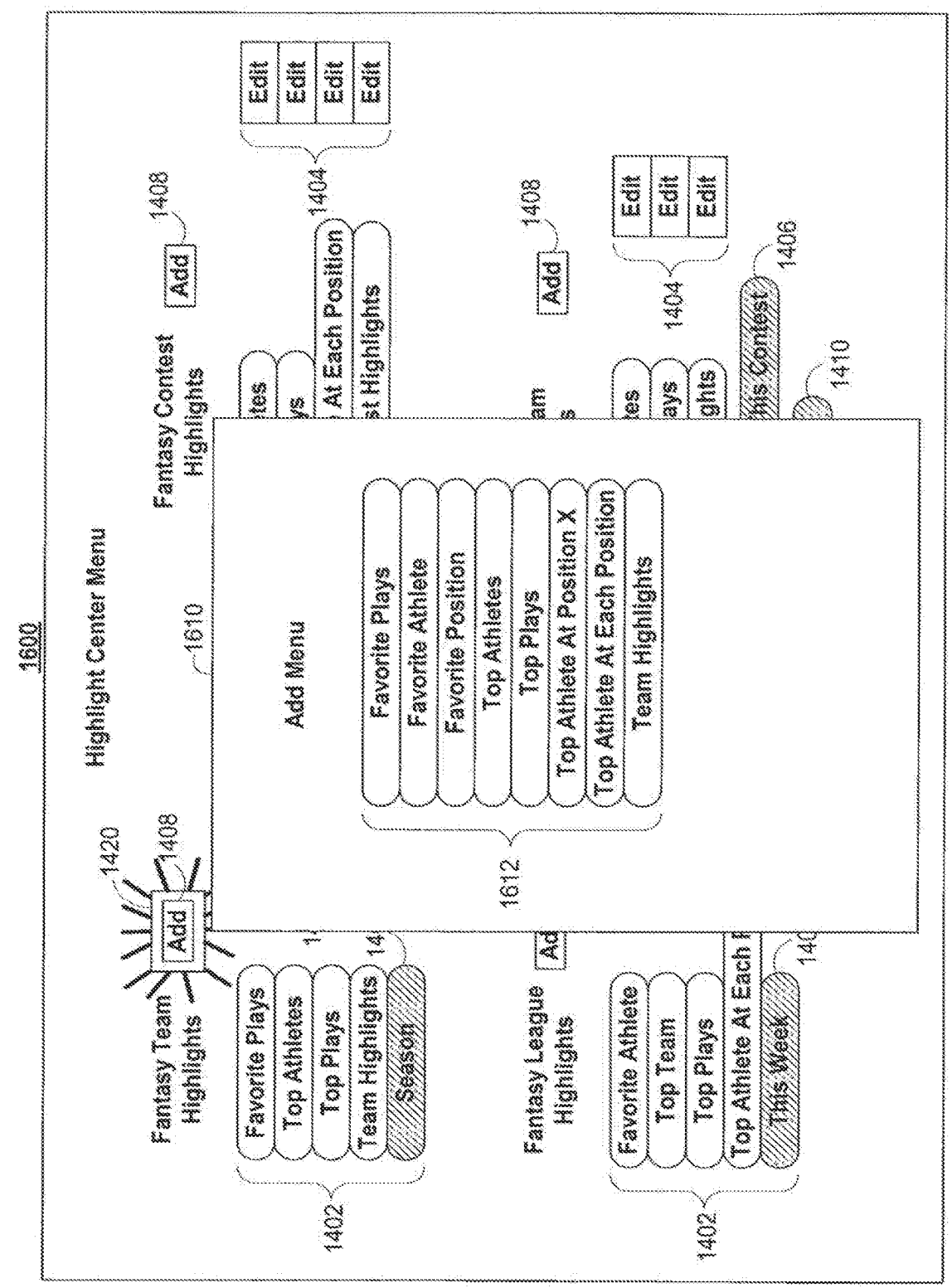
FIG. 16 shows an illustrative menu for adding a highlight segment compilation in accordance with one embodiment of the present invention.

As shown in FIG. 14, the fantasy sports contest application may enable the user to add a highlight segment compilation to a submenu listing using selectable elements 1408 displayed next to each submenu heading. As illustrated in FIG. 16, user selection of element 1408 may cause the fantasy sports contest application to display an add menu 1610 having selectable elements 1612 that represent the available subjects and themes for a new highlight segment compilation to be added to a submenu. A navigational highlight element 1620 may be displayed in menu 1610 to indicate a user selection. Upon user selection of element 1612, the fantasy sports contest application may add the selected highlight segment compilation to the appropriate submenu listing. In one suitable arrangement, the fantasy sports contest application may automatically display an edit menu upon user selection of element 1612 to enable the user to customize the highlight segment compilation to be added.

Figure 17:
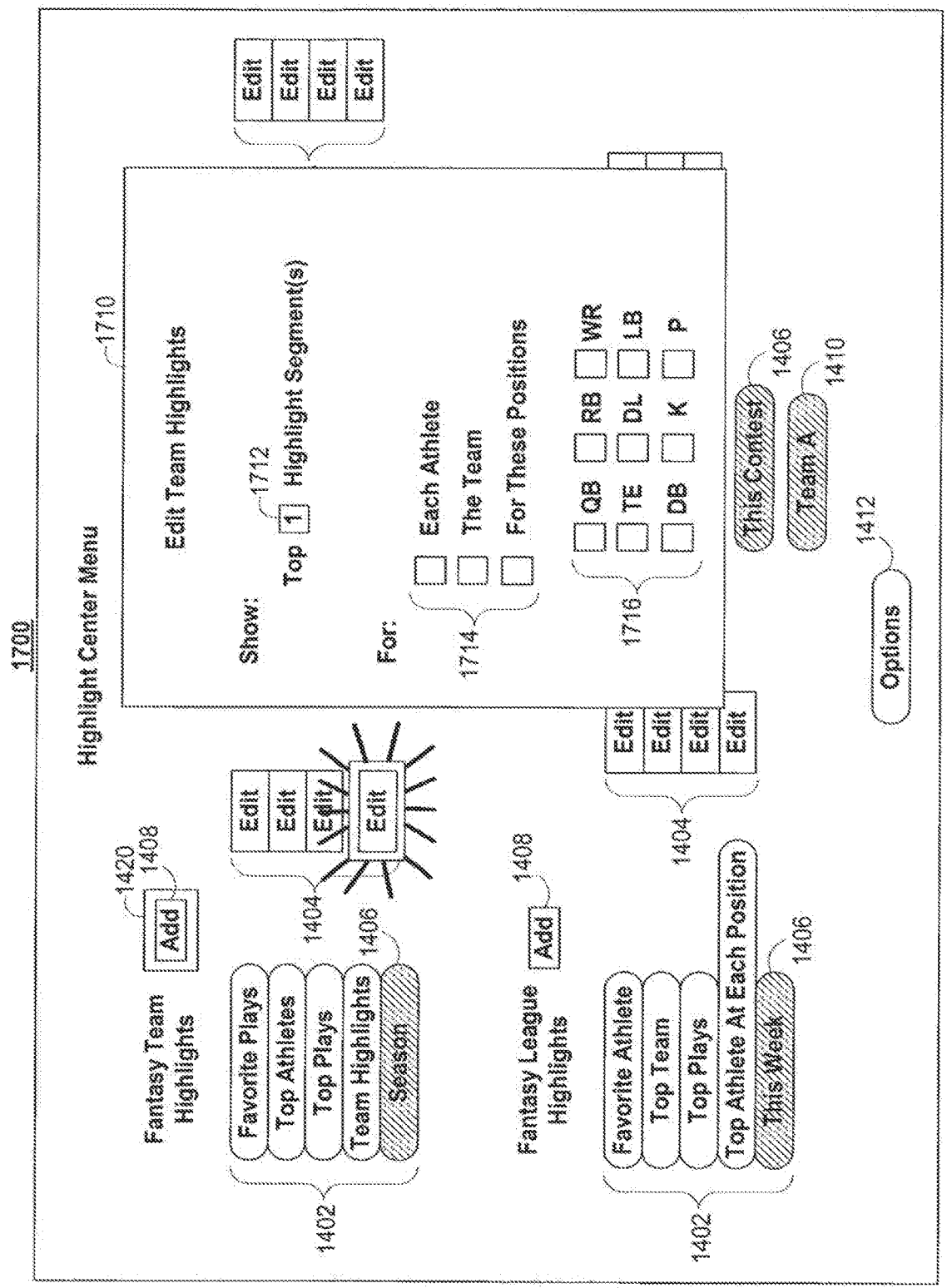
FIG. 17 shows an illustrative menu for editing a highlight segment compilation in accordance with one embodiment of the present invention.

FIG. 17 illustrates such an edit menu, which may also be accessed by user selection of selectable element 1404 in FIG. 14. In the example illustrated in FIG. 17, the user has chosen to edit a "Team Highlights" compilation under the "Fantasy Team Highlights" submenu, which may include highlight segments featuring the athletes on a particular fantasy sports contest team roster. Using input box 1712, the fantasy sports contest application may allow the user to choose to view a number of top highlight segments or all highlight segments for the athletes selected using selection boxes 1714 and 1716. For example, the user may choose to view the top three highlight segments for each athlete on the team roster, for the entire team, or for athletes at selected positions. Alternatively, the user may choose to view all highlight segments for selected athletes. Edit menu 1710 is only illustrative, and the fantasy sports contest application may enable the user to edit highlight segment compilations having different themes by providing different edit menus. It should be understood that, in general, the fantasy sports contest application enables the user to customize the selection criteria for the highlight segments to be included in a highlight segment compilation.

Selection criteria for highlight segment compilations that feature "Top" performances (e.g., "Top Athletes," "Top Plays," "Top Teams," etc.) may require the fantasy sports contest application to quantify the best and most exciting athletic performances with regard to plays, athletes, and teams. In one suitable arrangement, this may be accomplished using the scoring rules of the fantasy sports contest. For example, a "Top" athlete or "Top" team may be determined by the athlete's or team's fantasy sports contest point total. A "Top" play or "Top" highlight segment may be determined by the number of fantasy sports contest points scored by the athlete featured in the depicted real-life action.

In one suitable arrangement, the determination of scoring or ranking may be done with respect to real-life scoring. The two may differ in that the fantasy sports contest may award points to a particular play whereas in a real-life contest, the play (e.g., a first down in football or fastest lap in automotive racing) may not change the real-life score. Alternatively, any other suitable method or scheme for determining "Top" athletic performance may be used within the scope of the present invention.

In one suitable approach, the fantasy sports contest application may provide "Favorite" highlight segment compilations that include highlight segments selected based on specified user interest. The fantasy sports contest application may enable the user to select a favorite athlete, a favorite type of play, or any other user-specified favorite as the theme of a highlight segment compilation.

Figure 18:
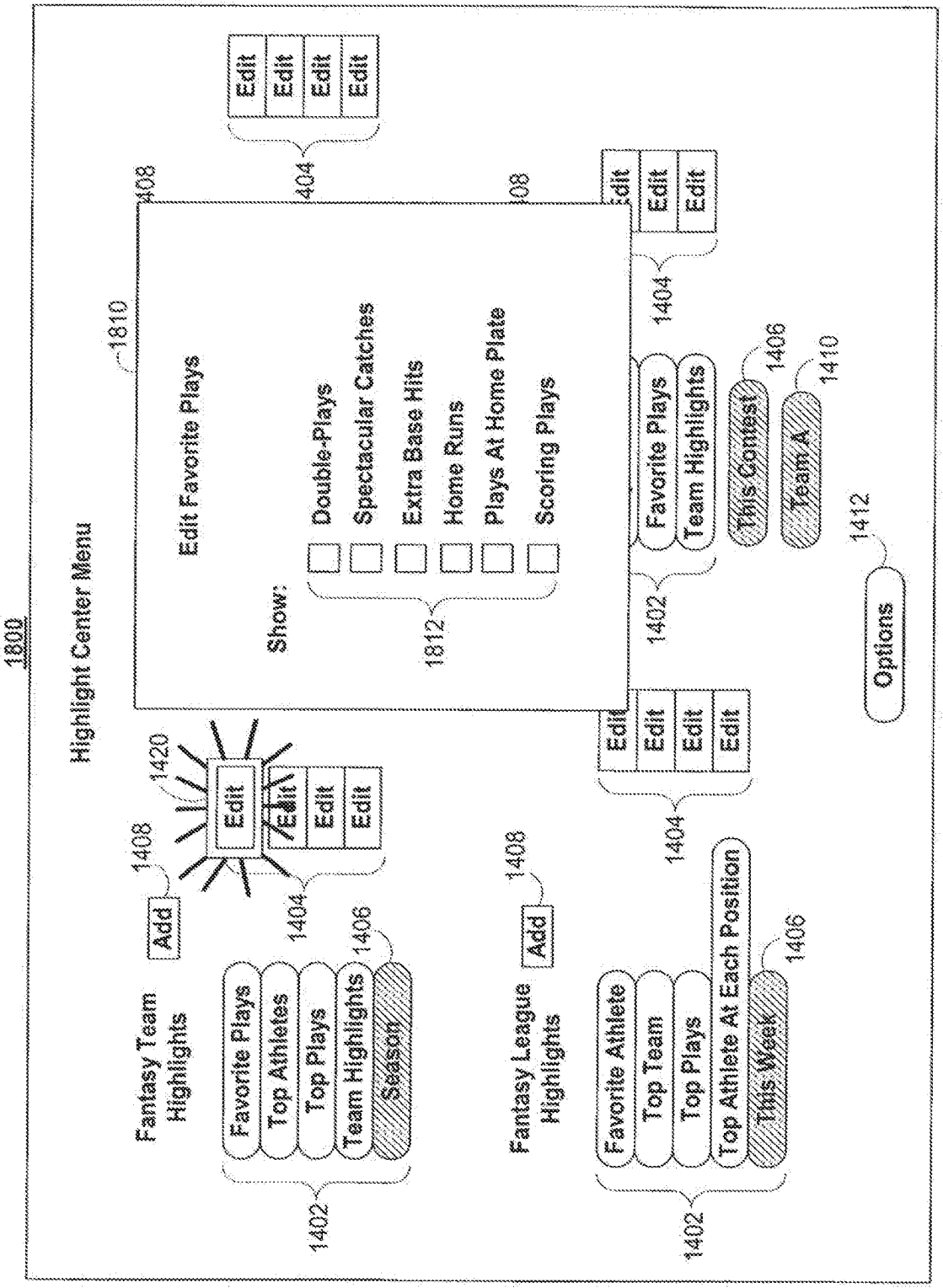
FIG. 18 shows an illustrative menu for selecting the user's favorite type of real-life play in accordance with one embodiment of the present invention.

As illustrated in FIG. 18, the fantasy sports contest application may provide the user with edit menu 1810 for selecting types of favorite real-life plays to be included in a highlight segment compilation. The user may be able to select one or more types of favorite real-life plays (e.g., in baseball, double plays, home runs, strike outs, etc.) using selection boxes 1812. In one suitable arrangement, each highlight segment compilation may hold one type of favorite play. Alternatively, several types of user-specified favorite plays may be combined into one highlight segment compilation.

Similarly, the fantasy sports contest application may provide the user with a "Favorite Athlete" compilation of highlight segments featuring a user-specified favorite athlete. As should be generally understood, highlight segment compilations featuring user-specified favorites may be modified for use within the scope of any of the submenus. For example, a "Favorite Plays" highlight segment compilation under the "Fantasy Team Highlights" submenu may feature highlight segments of the user's fantasy sports contest team athletes performing a user-specified type of favorite play.

In one suitable approach, the fantasy sports contest application may take into consideration the user's favorite types of plays when compiling highlight segment compilations. In one suitable arrangement, the fantasy sports contest application may enable the user to modify a highlight segment compilation to give preference to highlight segments that feature the user-specified types of favorite plays.

Figure 19:
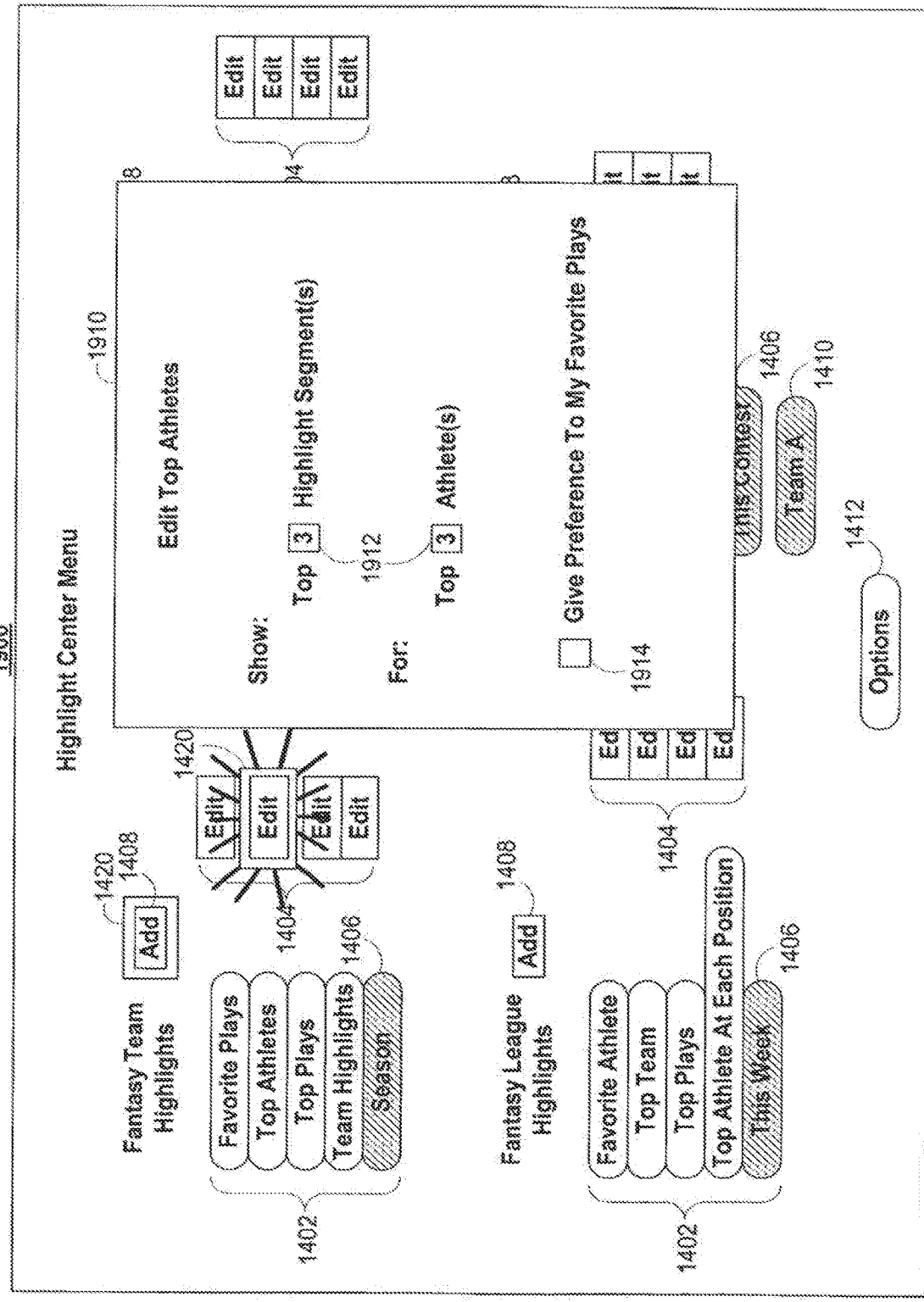
FIG. 19 shows an illustrative highlight segment compilation edit menu including a selectable element for enabling the favorite plays preference feature in accordance with one embodiment of the present invention.

As shown in FIG. 19, the fantasy sports contest application may provide preference feature selection element 1814, in addition to boxes 1912, in highlight segment compilation edit menu 1910. In one suitable arrangement, user selection of element 1914 may cause the fantasy sports contest application to note any "Favorite Plays" highlight segment compilations created by the user, and give preference to the types of plays indicated as user favorites in those highlight segment compilations.

Figure 20:
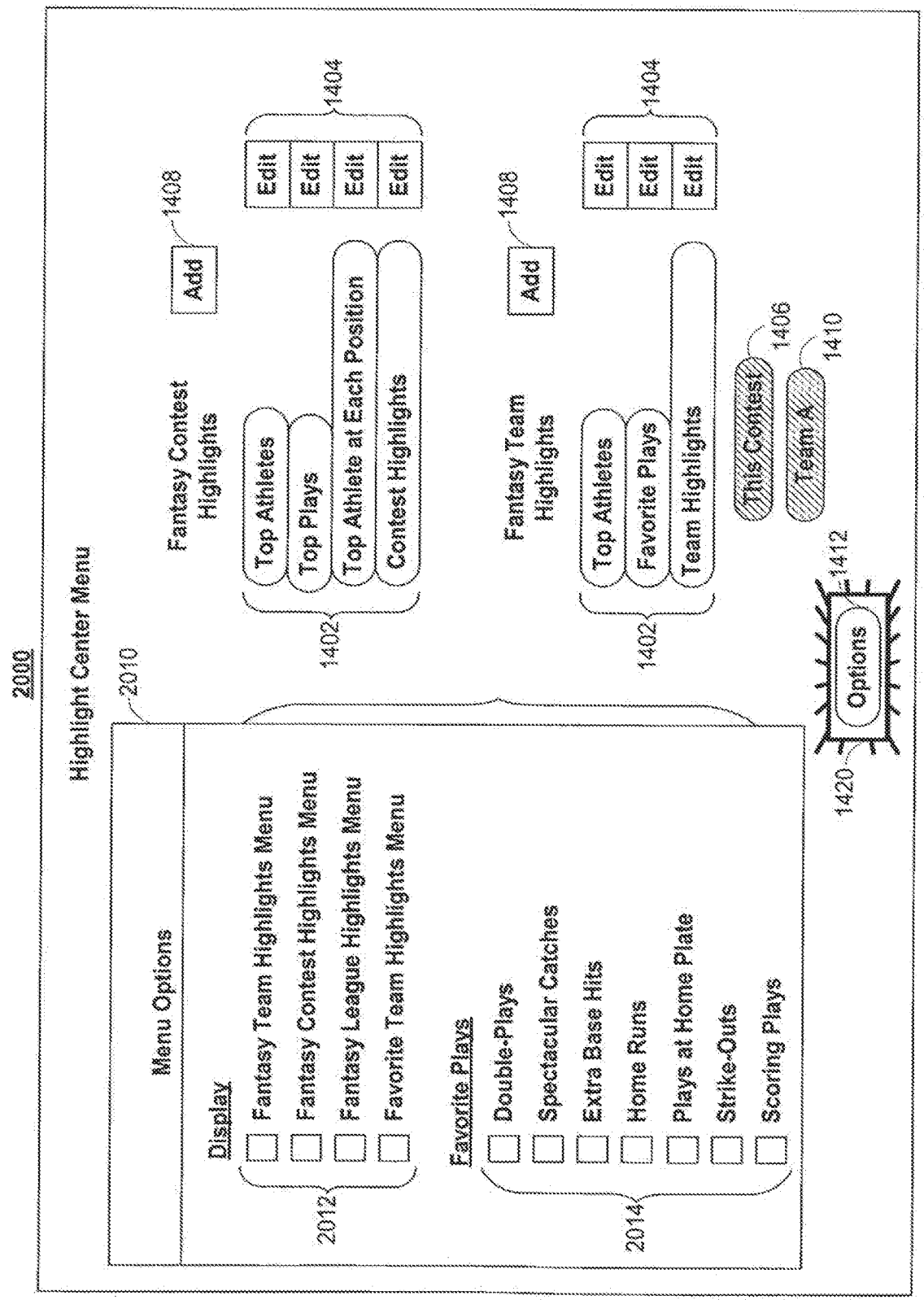
FIG. 20 shows an illustrative Highlight Center options menu in accordance with one embodiment of the present invention.

In one suitable arrangement illustrated by FIG. 20, the user may be given the ability to universally choose favorite types of plays through options menu 2010 that may be accessed using options button 1412 in the Highlight Center menu. Options menu 2010 may include selection boxes 2012 that enable the user to choose which submenus to display in the Highlight Center menu, and selection boxes 2014 that enable the user to universally select types of favorite plays. The fantasy sports contest application may enable the user to activate the favorite plays preference feature for a particular highlight segment compilation by selecting selectable element 1914, or may automatically give preference to the types of plays selected by the user in menu 2010 for all highlight segment compilations. Alternatively, any other suitable method may be used to ascertain the user's favorite types of athletic plays.

In one suitable approach, giving preference to a type of user-specified favorite play may mean that a highlight segment featuring the favorite type of play is automatically moved to the top of the list of highlight segments to be shown for an athlete or a team (e.g., in cases where "Top" plays or highlight segments are to be shown). Alternatively, the fantasy sports contest application may assign a highlight segment featuring a favorite play some predetermined value (e.g., a predetermined number of fantasy points), or give the highlight segment a predetermined boost in its value (e.g., by adding a predetermined number of fantasy points to the number of fantasy points earned by the highlight segment's featured athlete). It should be understood that any other method or scheme for giving preference to one or more types of user-specified favorite plays may be used within the scope of the present invention.

In one suitable approach, the fantasy sports contest application may provide the user with highlight segment compilations based on a favorite real-life sports team specified by the user. As shown in FIG. 14, the fantasy sports contest application may provide the user with a "Favorite Team Highlights" submenu that lists compilations of highlight segments featuring the athletes on a favorite real-life team specified by the user. The "Favorite Team Highlights" submenu may provide highlight segment compilations for a real-life sports team in a substantially equivalent manner as the "Fantasy Team Highlights" submenu provides highlight segment compilations for a fantasy sports contest team. Highlight segment compilations that are substantially equivalent to those listed under other submenus are available under the "Favorite Team Highlights" submenu, and may be added, edited, and modified in a substantially equivalent manner.

Figure 21:
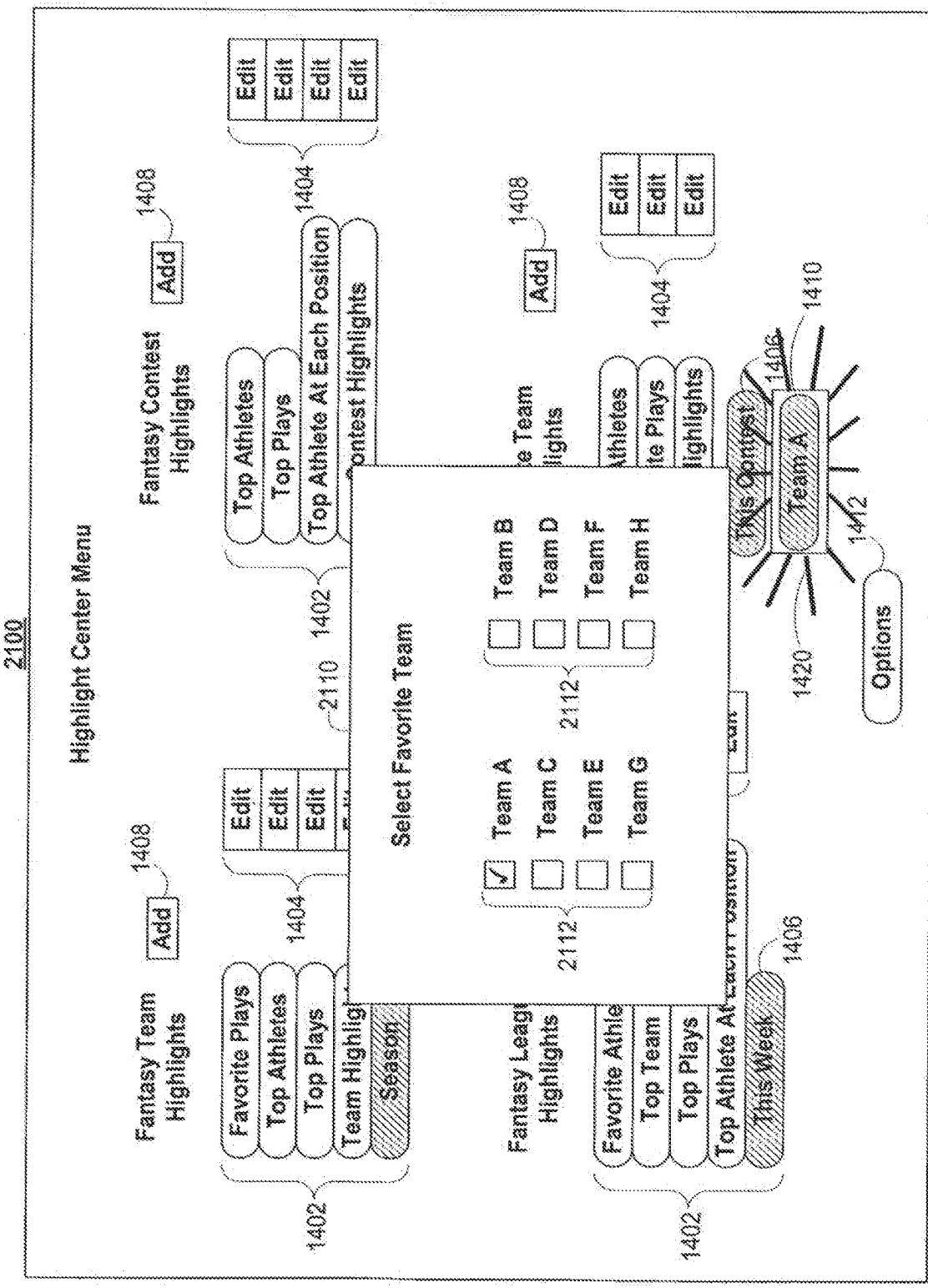
FIG. 21 shows an illustrative menu for selecting the user's favorite real-life team in accordance with one embodiment of the present invention.

As shown in FIG. 21, the fantasy sports contest application may enable the user to choose a favorite real-life team using selection menu 2110 that may be displayed ensuing user selection of selectable element 1410. Selection menu 2110 may include selection boxes 2112 that correspond to teams in a real-life sports league. User selection of a particular box 2112 may result in the designation of that particular team as the user's favorite team.

In one suitable approach, the fantasy sports contest application may, upon user selection of selectable element 1402, instantly parse a pool of highlight segments such as source of highlights 102 or highlights database 206 to instantly form a highlight segment compilation. For example, user selection of a highlight segment compilation for "Top Athletes" listed under the "Fantasy League Highlights" submenu and modified with the "Season" time period may cause the fantasy sports contest application to search contest database 104/204 for the athletes in the fantasy sports contest league that have the highest fantasy sports contest point totals for the season. The fantasy sports contest application may then select a number of these athletes (e.g., according to user instructions entered in a highlight segment compilation edit menu) to be featured in the highlight segment compilation. The fantasy sports contest application may then parse the pool of highlight segments for those featuring the selected athletes. The fantasy sports contest application may then further parse the highlight segments for each selected athlete (e.g., according to user instructions and the favorite plays preference feature) for inclusion in the highlight segment compilation. After determining the highlight segments to be included in a highlight segment compilation, the fantasy sports contest application may request the selected highlight segments (e.g., from source of highlights 102 or highlights database 206), capture the selected highlight segments from a television channel that is continuously transmitting highlight segments to user equipment (e.g., set-top box 218 over communications network 216), pull the selected highlight segments from local memory (e.g., processing equipment 119 or set-top box 218), or download the selected highlight segments using any other suitable method for display to the user.

Alternatively, the highlight segment compilation may be pre-arranged (e.g., continuously or periodically parsed before user selection of element 1402) and stored in database 206, server 212, set-top box 218, or any other suitable storage location for retrieval and display by the fantasy sports contest application. Similarly, pre-arranged highlight segment compilations may be continuously transmitted over a television channel for retrieval by the fantasy sports contest application.

In one suitable approach, the fantasy sports contest application may enable the user to download highlight segment compilations to a personal video recorder ("PVR") device such as a TiVo™ device at the user's location. The personal video recorder device may be provided as part of user equipment 110 or 214, or may be provided separately. If provided separately, the personal video recorder device may communicate with the fantasy sports contest application through user equipment to negotiate downloads of highlight segment compilations.

In one suitable arrangement, the fantasy sports contest application may download a highlight segment compilations to the personal video recorder upon user selection of the highlight segment compilation. In one suitable arrangement, the fantasy sports contest application may download all highlight segment compilations listed in Highlight Center menu 1400 to the personal video recorder device and update them continuously or periodically. In one suitable arrangement, the fantasy sports contest application may enable the user to select the particular highlight segment compilations to be automatically downloaded to a personal video recorder device. For example, the user may instruct the fantasy sports contest application to automatically download all highlight segments featuring the user's fantasy sports contest team to the user's personal video recorder device. The user may also be able instruct the fantasy sports contest application to automatically download only those highlight segments featuring real-life action that scored a certain number of fantasy points.

Figure 22:
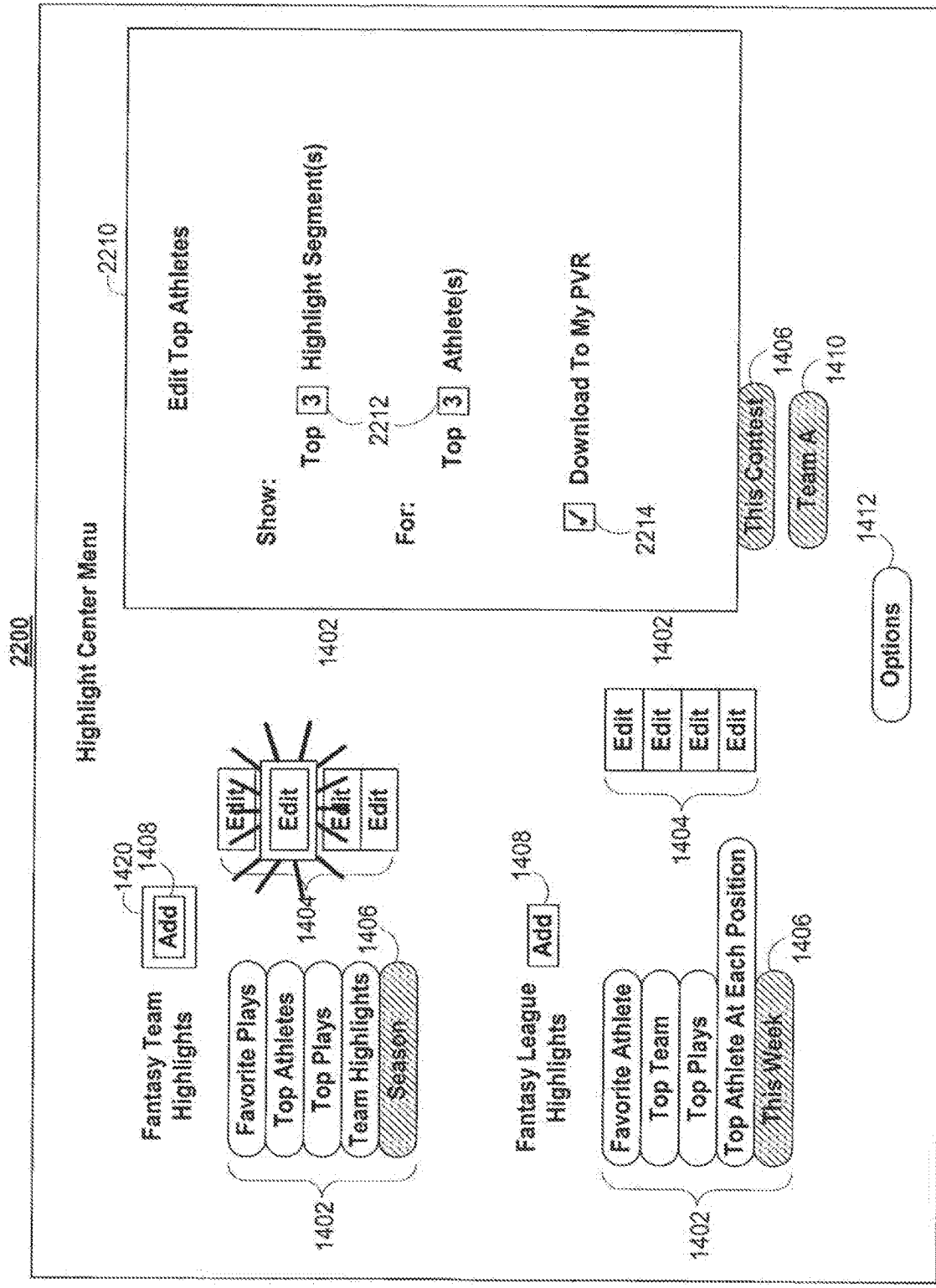
FIG. 22 shows an illustrative highlight segment compilation edit menu including a selectable element for instructing the fantasy sports contest application to download the highlight segment compilation to a personal video recorder device in accordance with one embodiment of the present invention.

As shown in FIG. 22, highlight segment compilation edit menu 2210 may include, in addition to selection boxes 2212, personal video recorder selection box 2214. User selection of box 2214 may instruct the fantasy sports contest application to download that particular highlight segment compilation to the personal video recorder device. Similarly, the fantasy sports contest application may continuously or periodically update the highlight segment compilations stored on the personal video recorder device as new highlight segments become available.

In one suitable approach, the fantasy sports contest application may enable the user to forward highlight segments stored on the user's personal video recorder device to other users. The fantasy sports contest application may enable the user to select a number of highlight segments to be sent, and designate the users to send the highlight segments to. In one suitable arrangement, the fantasy sports contest application may send the highlight segments from the user's personal video recorder device to the other user's set-top box. In another suitable arrangement, the fantasy sports contest application may identify the highlight segments to be sent, and instruct that the identified highlight segments be sent from main facility 202 or server 212 to the other user's set-top box. Alternatively, the fantasy sports contest application may only send the other user links (e.g., hyperlinks) to the highlight segments, which may be stored at main facility 202 or server 212. The other user may then select the link and download the highlight segment for viewing.

In one embodiment of the present invention, the user may be alerted while watching a television broadcast when real-life action of interest to the user occurs. The fantasy sports contest application may provide a highlight segment depicting the real-life action, and the user may watch the highlight segment. The highlight segment may be of real-life action that is relevant to the user's fantasy sports contest, real-life action from a contest involving the user's favorite team, or other real-life action of interest to the user. The highlight segment may be taken from footage of real-life action in the user's currently tuned television broadcast, from another television broadcast not being currently shown, or from any other source of highlight segments.

Figure 23:
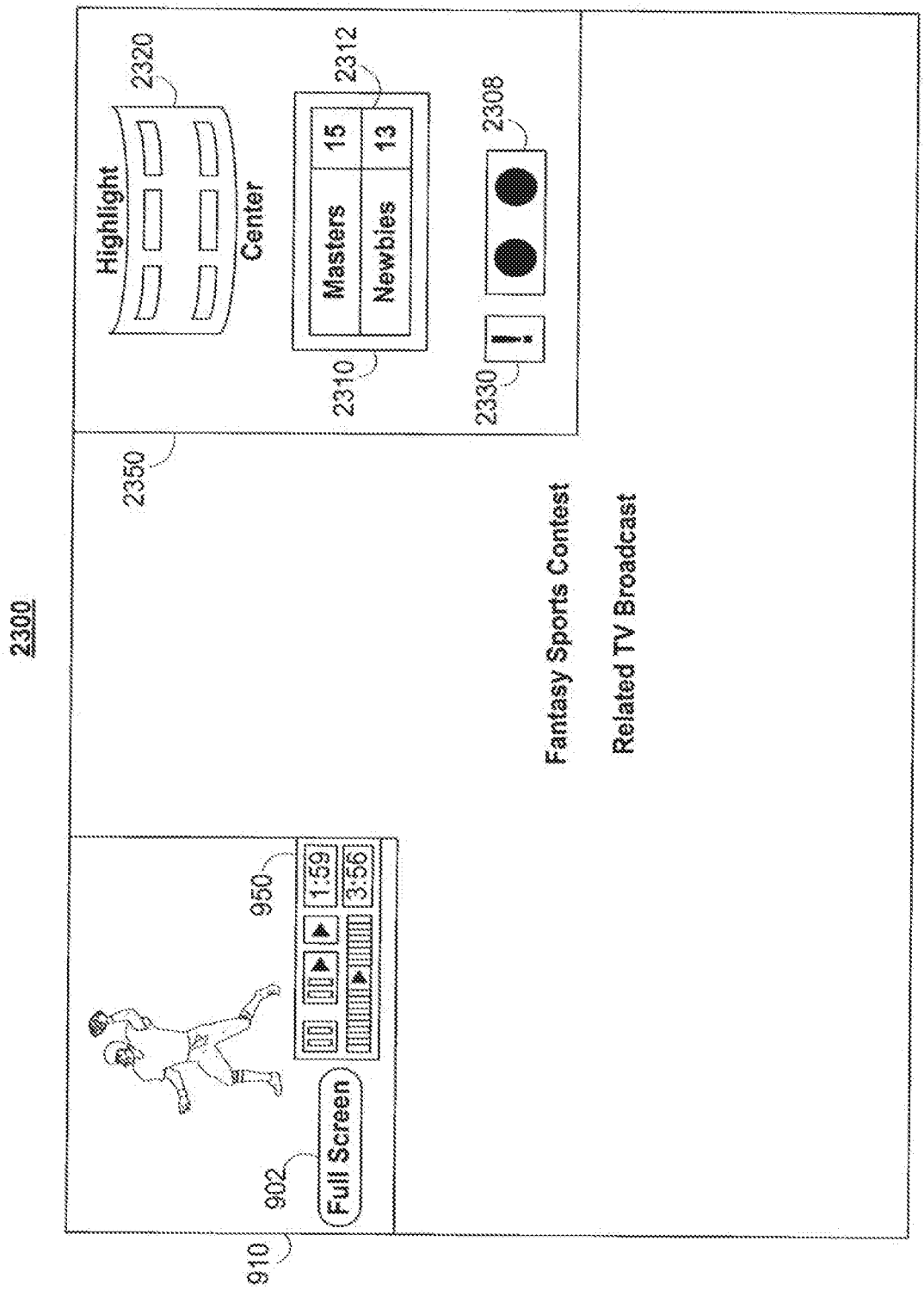
FIG. 23 shows an illustrative fantasy sports contest display on a fantasy sports contest related television broadcast in accordance with one embodiment of the present invention.

As illustrated by FIG. 23, a fantasy sports contest related television broadcast is displayed in television display screen 2300, along with fantasy sports contest display 2350 having Highlight Center 2320, fantasy sports contest information region 2312 (e.g., displaying the instant score of the user's fantasy sports contest), and navigation indicator 2310. User selection of fantasy sports contest information region 2312 may cause the fantasy sports contest application to display a full screen fantasy sports contest information screen, substantially equivalent to that of FIG. 4. Highlight Center 2320 may function in a manner substantially equivalent to Highlight Center 420 of the previous FIGS., or may function as an abridged version of Highlight Center 420. In an abridged version, Highlight Center 2320 may include selectable links to compilations of highlight segments from the current round of fantasy competition.

In one suitable approach, when a highlight segment depicting real-life action of interest to the user becomes available, the fantasy sports application may alert the user by visual means, audio means, or both. An example of such an alert may be video tape symbol 2308 displayed in fantasy sports contest display 2350, which may also be accompanied by an audio alert sound. In one suitable arrangement, the audio alert may be used to differentiate the importance of the play that has just occurred. For example, real-life action resulting in the awarding of fantasy sports contest points in the user's current fantasy sports contest against another fantasy sports contest team may warrant display of alert symbol 2308 accompanied by an audio alert, whereas action resulting in the awarding of fantasy sports contest points outside of the user's current contest may only warrant the display of alert symbol 2308. Similarly, real-life action resulting in the awarding of points in a contest involving the user's favorite real-life team may warrant display of both alert symbol 2308 and an audio alert, whereas real-life action not resulting in the scoring of points may warrant only the display of alert symbol 2308.

In one suitable arrangement, in order to avoid too many alerts, the fantasy sports application may only alert the user of highlight segments depicting real-life action resulting in scoring in the user's current fantasy sports contest (e.g., against another fantasy sports contest team) or scoring in a contest involving the user's favorite team. If the user wishes to view the highlight segment, the user may select alert symbol 2308 to play the highlight segment. The highlight segment may be displayed in an inset screen 910 as shown in FIG. 14, in a full screen substantially equivalent to that of FIG. 10, in a display window substantially equivalent to that of FIG. 11, in a web browser application display substantially equivalent to that of FIG. 12, or in any other suitable display format.

In one suitable arrangement, the user may not be alerted of newly available highlight segments, and a highlight segment of interest to the user may be automatically displayed to the user.

As illustrated in FIG. 23 a video control tool 950, substantially equivalent to that of FIGS. 9-11, may be provided by the fantasy sports contest application to control the display of a newly available highlight segment. Elements 902 and 1002 may also be provided to toggle between an inset screen format and a full screen format for displaying highlight segments. Identification screens or identification banners substantially equivalent to those of FIGS. 9 and 13, respectively, may be displayed in conjunction with the newly available highlight segment.

Figure 24:
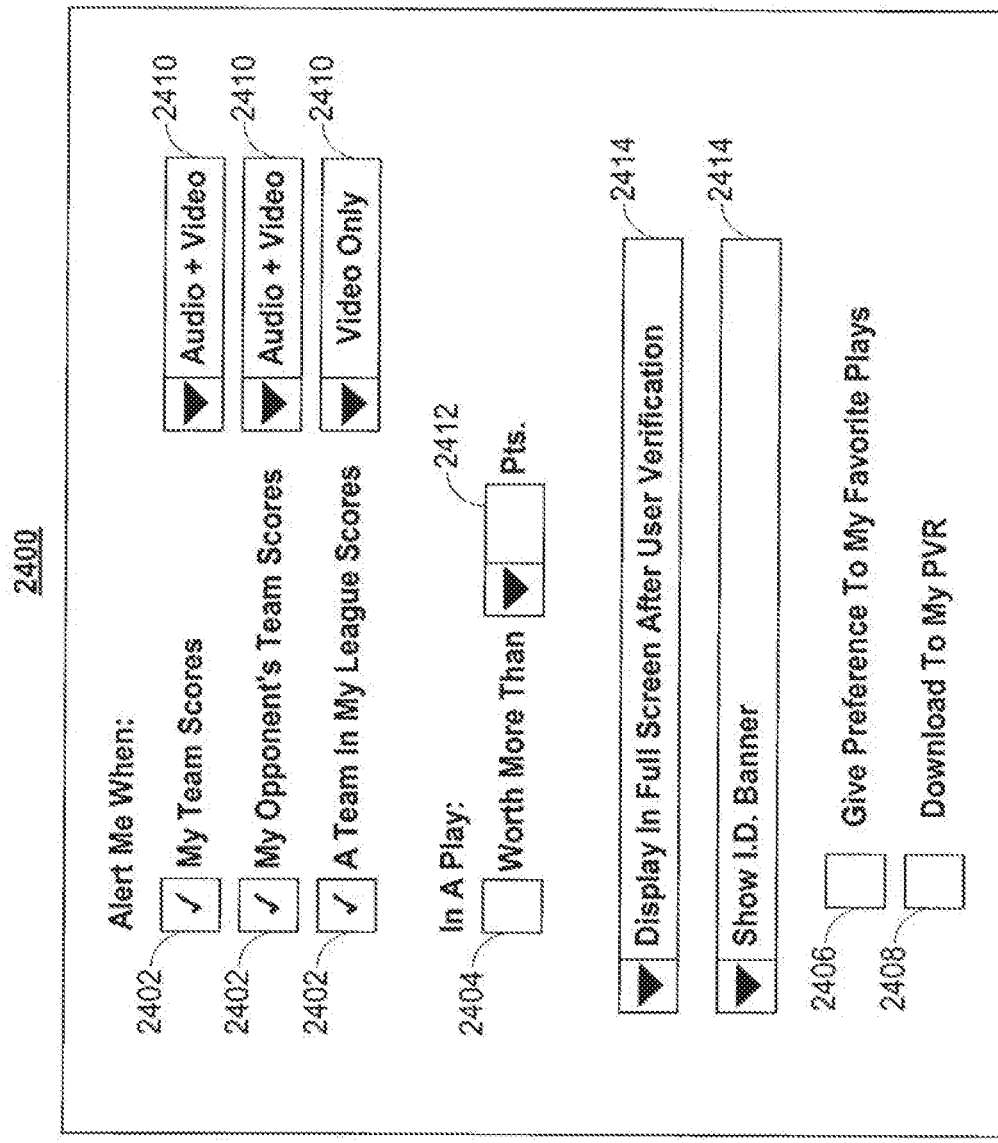
FIG. 24 shows an illustrative menu for editing user alert preferences in accordance with one embodiment of the present invention.

As illustrated in FIG. 23, selectable element 2330 may also be displayed in fantasy sports contest display 2350 as a link to an options menu for editing user options in connection with highlight segment alerts. As shown in FIG. 24, the user may use check boxes 2402 to select when the user wishes to be alerted of relevant real-life action. For example, the user may wish to be alerted when the user's fantasy sports contest team scores fantasy points, when the user's fantasy sports contest opponent scores fantasy points, or when any fantasy sports contest team in the user's league scores fantasy points.

The user may choose to be alerted when the user's favorite real-life athlete or team scores in a contest, when the real-life athlete's or team's opponent scores in the contest, or when any other significant real-life action occurs in the contest. In one suitable arrangement, as a way of judging when significant real-life action has occurred, the user may choose to be alerted when the user's favorite real-life athlete or team merits fantasy points, although fantasy points are not actually awarded in the fantasy sports contest. In one suitable arrangement, the fantasy sports contest application may determine a user's favorite real-life athlete or team using information from highlight segment compilations created by the user. Alternatively, the fantasy sports contest application may provide separate means (e.g., selection menus similar to FIG. 21) to designate user favorites for use in this aspect of the embodiment.

In one suitable approach, the user may choose to be alerted when real-life action of interest occurs in a local sports contest. For example, if the user is located in Seattle, then the user may select to be alerted about significant action occurring in a game involving a sports team from the Seattle area. In another suitable approach, the fantasy sports contest application may enable the user to choose from a menu of contests in progress. The fantasy sports contest application may then provide highlight segments of significant action from the user selected contests.

As shown in FIG. 24, the user may use selection box 2404 and drop down menu 2412 to limit highlight segment alerts by the number of fantasy or real-life points scored in the highlight segment. The user may use drop down menus 2410 to customize what form the alerts should take for each selected alert situation. Menu 2400 may also enable the user to configure other options, using drop down menus 2414, related to displaying a highlight segment, such as whether to prompt for user verification before displaying the highlight segment, and whether to include an identification screen or identification banner in the display. Menu 2400 may also include selection box 2406 for enabling the favorite plays preference feature, and selection box 2408 for instructing the fantasy sports contest application to download displayed highlight segments to a personal video recorder device.

Figure 25:
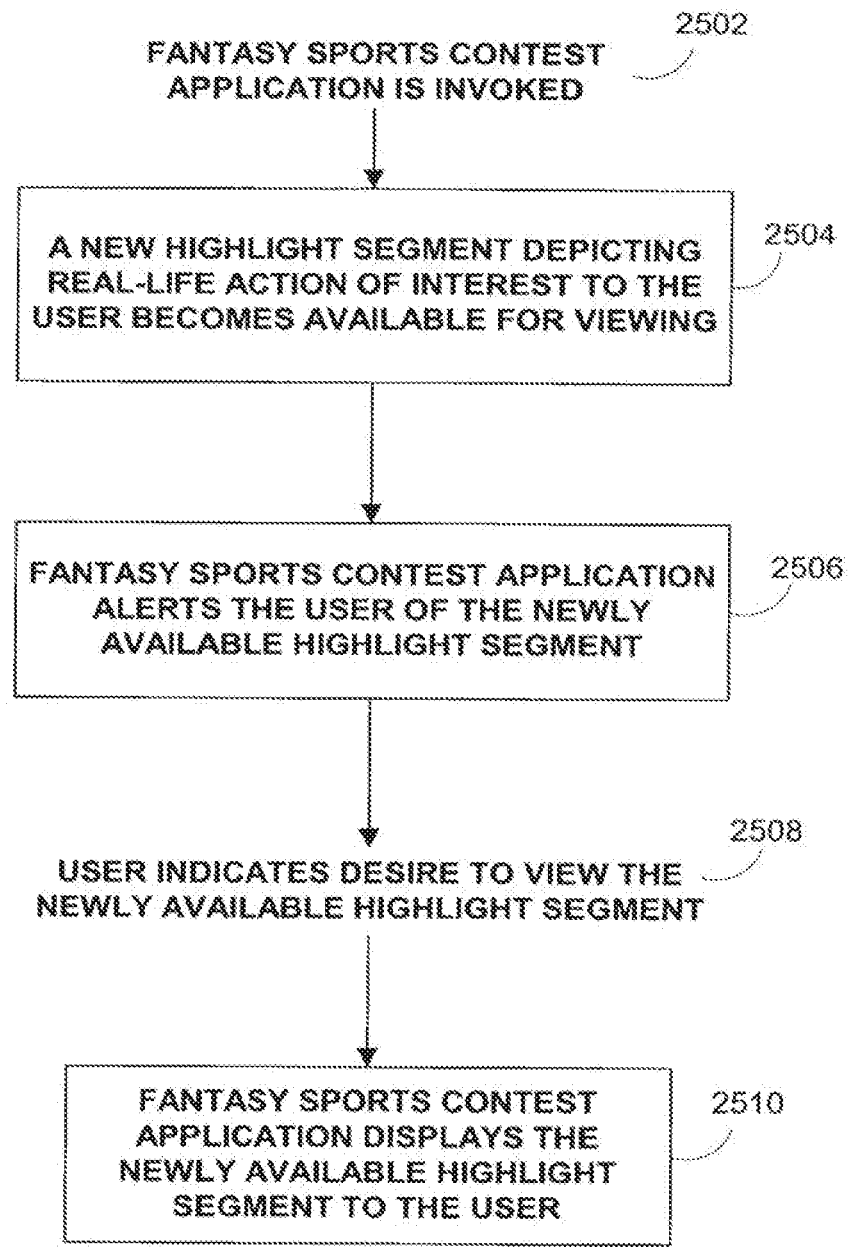
FIG. 25 shows a flow chart of illustrative steps for alerting the user of newly available highlight segments in accordance with one embodiment of the present invention.

FIG. 25 is a flow chart of illustrative steps involved in alerting the user of the availability of highlight segments featuring real-life action of interest to the user. At step 2502, the fantasy sports contest application is invoked. When real-life action of interest to the user occurs, the fantasy sports contest captures the relevant action in a highlight segment which is made available for viewing (step 2504). The fantasy sports contest application then alerts the user that a highlight segment is available for viewing (step 2506). Upon user indication of a desire to view the relevant highlight segment (step 2508), the fantasy sports contest application displays the highlight segment to the user (step 2510). Alternatively, the newly available highlight segment may be automatically displayed to the user after step 2504.

In one embodiment of the present invention, the fantasy sports contest application may determine automatically for the user (i.e., without the need of user input or with minimal user input) which highlights to provide to the user. The fantasy sports contest application may based its determination of which highlights to provide to the user based on any suitable criteria. For example, the fantasy sports contest application, any other suitable application, third party user information provider, any other suitable data source, or any combination thereof may compile information regarding the user's preferences. For example, the fantasy sports contest application may monitor the user's actions with respect to fantasy sports contests and at least partially compile data based on what is learned through the monitoring.

Preferences may include information such as favorite athletes, favorite teams, favorite types of plays, or any other suitable preference (e.g., as discussed with respect to FIGS. 14-22). The preferences may also include information such as whether the user prefers to watch highlights in a full screen arrangement or in a partial screen arrangement, how many highlights the user prefers to have in a particular compilation, and any other such preferences.

The preference information for the user may be collected and stored in a user profile. The user profile may be located at user equipment 110, server 100, at any other suitable locations, or at any combination thereof. The fantasy sports contest application, when determining which highlights to provide to the user, may access the user profile. The highlights selected are thus based on the user's preferences.

For example, if the user participates in a fantasy football contest and prefers to see highlights of plays related to touchdowns, and has a particular football player on fantasy contest team roster, then the fantasy sports contest application may compile highlights based on this criteria. In this situation, the fantasy sports contest application may compile two or three highlights of the particular player scoring touchdowns (e.g., leaving out a play in which the particular player intercepted the ball because based on the user's preferences, the user in all likelihood will not be interested in such a play). If the fantasy sports contest application has determined that the user prefers to see the highlights together with fantasy sports contest information regarding the user's standing within the fantasy sports contest league, then the fantasy sports contest application may automatically display the highlights when the user access the league standing information (e.g., in a portion of the display screen). These highlights may be presented in an inset screen, as background "wallpaper' for the display or any other suitable display arrangement.

Figure 26:
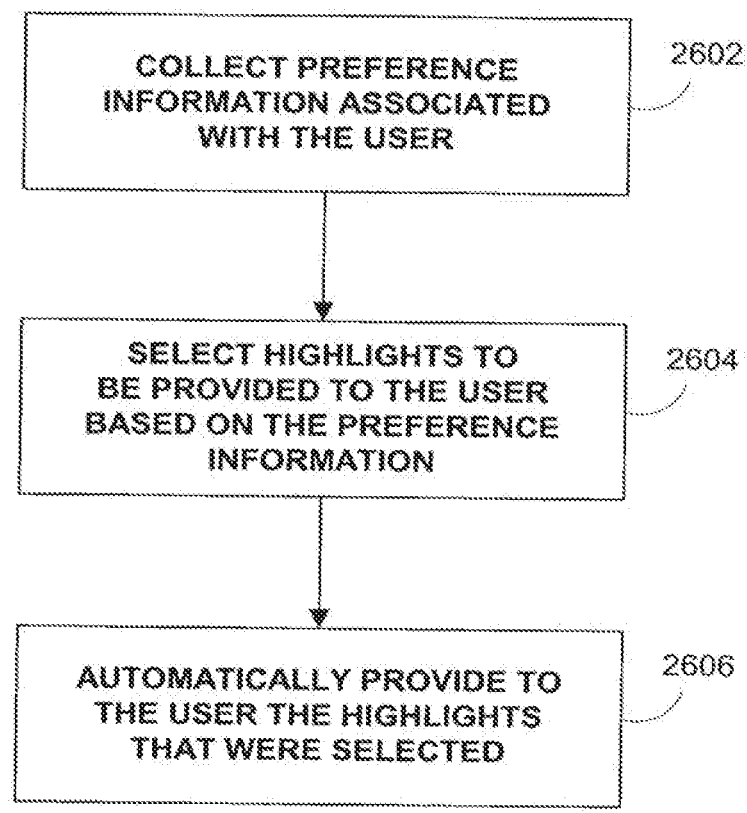
FIG. 26 shows a flow chart of illustrative steps for providing users with highlight segments according to user preferences in accordance with one embodiment of the present invention.

FIG. 26 is a flow chart of illustrative steps involved in automatically displaying highlights to a user. At step 2602, preference information associated with the user is collected. For example, the fantasy sports contest application may monitor the user's actions and may at least partially compile preference information based on preferences.

At step 2604, the fantasy sports contest application selects the highlights that are to be provided to the user based on the preference information that was collected in step 2602.

At step 2606, the fantasy sports contest application automatically provides to the user the highlights that were selected in step 2604. The fantasy sports contest application may, for example, display a selectable option to the user to play the selected highlights. Alternatively, the fantasy sports contest application may provide the selected highlights at any suitable place or time (e.g., one of the selected highlights may be provided when the user accesses a portion of fantasy sports contest information in some way associated with the highlight). Any such way of providing the user with the ability to view the selected highlights may be used.

It will be understood that the user may change or otherwise customize the highlights that are to be selected by the fantasy sports contest information (e.g., the user may edit the user profile by explicitly indicating user preferences as in FIGS. 14-21).

Thus, systems and methods for fantasy sports contests with real-life highlight segments are provided. One skilled in the art will appreciate that the present invention can be practiced by other than the described embodiments, which are presented for purposes of illustration and not of limitation, and the present invention is limited only by the claims which follow.

What is claimed is:

1. A method for providing a highlight segment to a user participating in a fantasy sports contest, the method comprising:
    accessing, using control circuitry, fantasy sports contest information associated with a user from a database, wherein the fantasy sports contest information comprises a fantasy roster containing names of real-life athletes selected by the user;
    obtaining, via a network, media content of a media asset relating to a fantasy sports contest from a content provider;
    determining, in real time, whether an event from the media asset is associated with at least one of the real-life athletes selected by the user;
    in response to determining that the event from the media asset is associated with at least one of the real-life athletes selected by the user generating, using the control circuitry, a footage portion from the media asset as a newly available highlight segment depicting the event;
    alerting the user, using the control circuitry, that the newly available highlight segment has become available for viewing;
    receiving, using the control circuitry, a user input to view the newly available highlight segment; and
    generating for display, using the control circuitry, the newly available highlight segment.

2. The method of claim 1, further comprising:
    selecting an alert type, from a plurality of alert types, based on the at least one of the real-life athletes with which the newly available highlight segment is associated.

3. The method of claim 1, further comprising:
    generating for display an option to receive an alert when the newly available highlight segment depicting the event is available for viewing; and
    receiving a user selection of the option.

4. The method of claim 1, further comprising:
    comparing a number of points scored by the at least one of the real-life athletes selected by the user in the depicted event to a threshold number of points; and
    determining to alert the user based on the number of points scored being higher than the threshold number of points.

5. The method of claim 1, further comprising:
    determining a type of play performed by the at least one of the real-life athletes in the depicted event; and
    determining to alert the user based on the type of play.

6. The method of claim 1, further comprising:
    identifying a second newly available highlight segment associated with a favorite team of the user; and
    alerting the user that the second newly available highlight segment has become available for viewing.

7. The method of claim 1, further comprising:
    identifying a second newly available highlight segment associated with a team that is local to the user; and
    alerting the user that the second newly available highlight segment has become available for viewing.

8. The method of claim 1, further comprising:
    generating for display an identification of the at least one of the real-life athletes in the newly available highlight segment with the newly available highlight segment.

9. The method of claim 1, wherein the identifying of the newly available highlight segment is based on preference information associated with the user.

10. The method of claim 1, wherein the control circuitry alerts the user that the newly available highlight segment has become available for viewing while concurrently generating for display a real-time sports game.

11. A system for providing a highlight segment to a user participating in fantasy sports contest, the system comprising:
    a memory configured to store fantasy sports contest information associated with a user from a database, wherein the fantasy sports contest information comprises a fantasy roster containing names of real-life athletes selected by the user;
    communication circuitry configured to obtain media content of a media asset relating to a fantasy sports contest from a content provider; and
    control circuitry configured to:
        determine, in real time, whether an event from the media asset is associated with at least one of the real-life athletes selected by the user;
        in response to determining that the event from the media asset is associated with at least one of the real-life athletes selected by the user, generate a footage portion from the media asset as a newly available highlight segment depicting the event;
        alert the user that the newly available highlight segment has become available for viewing;
        receive a user input to view the newly available highlight segment; and
        generate for display the newly available highlight segment.

12. The system of claim 11, wherein the control circuitry is further configured to:
    select an alert type, from a plurality of alert types, based on the at least one of the real-life athletes with which the newly available highlight segment is associated.

13. The system of claim 11, wherein the control circuitry is further configured to:
    generate for display an option to receive an alert when the newly available highlight segment depicting the event is available for viewing; and
    receive a user selection of the option.

14. The system of claim 11, wherein the control circuitry is further configured to:
    compare a number of points scored by the at least one of the real-life athletes selected by the user in the depicted event to a threshold number of points; and
    determine to alert the user based on the number of points scored being higher than the threshold number of points.

15. The system of claim 11, wherein the control circuitry is further configured to:
    determine a type of play performed by the at least one of the real-life athletes in the depicted event; and
    determine to alert the user based on the type of play.

16. The system of claim 11, wherein the control circuitry is further configured to:
    identify a second newly available highlight segment associated with a favorite team of the user; and alert the user that the second newly available highlight segment has become available for viewing.

17. The system of claim 11, wherein the control circuitry is further configured to:
identify a second newly available highlight segment associated with a team that is local to the user; and
alert the user that the second newly available highlight segment has become available for viewing.

18. The system of claim 11, wherein the control circuitry is further configured to:
generate for display an identification of the at least one of the real-life athletes in the newly available highlight segment with the newly available highlight segment.

19. The system of claim 11, wherein the identifying of the newly available highlight segment is based on preference information associated with the user.

20. The system of claim 11, wherein the control circuitry alerts the user that the newly available highlight segment has become available for viewing while generating for display a real-time sports game.

* * * * *